US008285635B2

(12) United States Patent
Rhodes, III

(10) Patent No.: US 8,285,635 B2
(45) Date of Patent: *Oct. 9, 2012

(54) WHOLE CROP BIOFUEL PRODUCTION (WCBP)

(76) Inventor: James S. Rhodes, III, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,173

(22) Filed: Jul. 27, 2011

(65) Prior Publication Data

US 2012/0023000 A1  Jan. 26, 2012

Related U.S. Application Data

(60) Provisional application No. 61/477,860, filed on Apr. 21, 2011.

(51) Int. Cl.
G06Q 40/00 (2006.01)
(52) U.S. Cl. ............................................. 705/37; 705/35
(58) Field of Classification Search .................. 705/35, 705/37
See application file for complete search history.

(56) References Cited

U.S. PATENT DOCUMENTS

| 6,355,456 | B1 | 3/2002 | Hallberg et al. |
| 6,718,653 | B1 | 4/2004 | Sartorio |
| 7,381,550 | B2 | 6/2008 | Hallberg et al. |
| 2008/0183523 | A1* | 7/2008 | Dikeman ......................... 705/7 |
| 2010/0120128 | A1 | 5/2010 | Liang |
| 2010/0145716 | A1 | 6/2010 | Zeng |
| 2010/0233789 | A1 | 9/2010 | Rosenbaum |
| 2010/0279391 | A1 | 11/2010 | Rosenbaum et al. |
| 2010/0331580 | A1 | 12/2010 | Ridgley |

FOREIGN PATENT DOCUMENTS

AU  2008326248  9/2009

OTHER PUBLICATIONS

Biofuels Update: Highlands Envirofuels Gets Permit for Ethanol Production Plant, Sep. 29, 2011, 1 page.
"Detailed California-Modified GREET Pathway for Conversion of Midwest Soybeans to Biodiesel (Fatty Acid Methyl Esters-FAME)," California Environmental Protection Agency, Air Resources Board, Stationary Source Division, Dec. 14, 2009, Version: 3.0, 65 pages.
"Detailed California-Modified GREET Pathway for Corn Ethanol," California Environmental Protection Agency, Air Resources Board, Stationary Source Division, Feb. 27, 2009, Version: 2.1, 73 pages.

(Continued)

*Primary Examiner* — James Vezeris
(74) *Attorney, Agent, or Firm* — Proskauer Rose LLP

(57) ABSTRACT

A computerized method of using a data processor having a memory to account for carbon flows and determine a regulatory value for a biofuel can include (i) storing, in memory, a first set of one or more carbon flow values characterizing the production and use of a biofuel derived from a first fraction of an agricultural biomass, (ii) storing, in memory, a second set of one or more carbon flow values characterizing the production and use of a co-product from a second fraction of the agricultural biomass, wherein the second fraction comprises an agricultural residue and wherein the co-product mitigates anthropogenic greenhouse gas emission, and (iii) calculating, using the data processor, a regulatory value for the biofuel from the first and second sets of carbon flow values.

20 Claims, 11 Drawing Sheets

OTHER PUBLICATIONS

"Technology for Ethanol Production," Raizen, (available at http://www.raizen.com/en/segmento-de-negocios/etanol.aspx, last accessed on Aug. 24, 2011).

Gerfried Jungmeier, "The Impact of Energy Crop Cultivation in LCA of Transportation Biofuels," Bioenergy NoE Final Seminar, Nov. 2$^{nd}$ and 3$^{rd}$, 2009, Romarin Suite, Meridien Hotel, Brussels, pp. 1-23. (available at http://www.bioenergy-noe.com/Resources/user/Gerfried%20Jungmeier,%20JR%20-%20Impact%20of%20energy%20crop%20cultivation%20in%20LCA%20of%20transportation%20biofuels.pdf, last accessed on Aug. 24, 2011).

Sacha Alberici and Carlo Hamelinck, "Annotated example of a GHG calculation using the EU Renewable Energy Directive Methodology," Sep. 30, 2010, Ecofys, 24 pages, (available at http://ec.europa.eu/energy/renewables/biofuels/doc/ecofys_report_annotated_example_actual_ghg_value.pdf, last accessed on Aug. 24, 2011).

"ISCC System Opportunities under EU recognition," 26 pages, (available at http://www.iscc-system.org/e865/e890/e954/e962/ISCC205GHGEmissionCalculationMethodologyandGHGAudit_eng.pdf, last accessed on Aug. 24, 2011).

"Fuels Guidance Documents," California Environmental Protection Agency, Air Resources Board, Reviewed Jun. 14, 2011, 148 pages, (available at http://www.arb.ca.gov/fuels/guidancedocs.htm, last accessed on Aug. 24, 2011).

"Register Your Biofuel Facility," California Environmental Protection Agency, Air Resources Board, May 20, 2011, 36 pages, (available at http://www.arb.ca.gov/fuels/lcfs/reportingtool/biofuelregistration.htm, last accessed on Aug. 24, 2011).

"Bio-energy with carbon capture and storage," Wikipedia, pp. 1-6, (available at http://en.wikipedia.org/wiki/Bio-energy_with_carbon_capture_and_storage, last accessed on Aug. 24, 2011).

"Biochar," Wikipedia, pp. 1-11, (available at http://en.wikipedia.org/wiki/Biochar, last accessed on Aug. 24, 2011).

Stuart E. Strand and Gregory Benford, "Ocean Sequestration Of Crop Residue Carbon: Recycling Fossil Fuel Carbon Back to Deep Sediments," Environ. Sci. Technol., 2009, 43, pp. 1000-1007, (available at http://www.physics.uci.edu/faculty/2009-Ocean-Sequestr-CROPS.pdf, last accessed on Aug. 24, 2011).

"Carbon sequestration," Wikipedia, pp. 1-13, (available at http://en.wikipedia.org/wiki/Carbon_sequestration, last accessed on Aug. 24, 2011).

Leon Clarke, Kate Calvin, James A. Edmonds, Page Kyle, and Marshall Wise, "Technology and International Climate Policy," Dec. 2008, Discussion Paper 08-21, The Harvard Project on International Climate Agreements, 37 pages, (available at http://belfercenter.ksg.harvard.edu/publication/18678/technology_and_international_climate_policy.html, last accessed on Aug. 24, 2011).

"Carbon Emissions: CO2 could sink without trace by 2100," International Institute for Applied Systems Analysis (IIASA), 3 pages, (available at http://www.iiasa.ac.at/Admin/INF/feature_articles/Options/2010/November/co2_sink.html, last accessed on Aug. 24, 2011).

P. Luckow, J.J. Dooley, M.A. Wise, and S.H. Kim, "Biomass Energy for Transport and Electricity: Large Scale Utilization Under Low CO2 Concentration Scenarios," Pacific Northwest National Laboratory, U.S. Department of Energy, Jan. 2010, 28 pages, (available at http://www.pnl.gov/main/publications/external/technical_reports/PNNL-19124.pdf, last accessed on Aug. 24, 2011).

"The Status of CSS Projects Interim Report 2010," Archer Daniels Midland Company Ethanol Plant Industrial CCS, 9 pages, (available at http://www.globalccsinstitute.com/resources/projects/archer-daniels-midland-company-ethanol-plant-industrial-ccs, last accessed on Aug. 24, 2011).

R.T. Dahowski and J.J. Dooley, "Source/Sink Matching for U.S. Ethanol Plants and Candidate Deep Geologic Carbon Dioxide Storage Formations," Pacific Northwest National Laboratory, U.S. Department of Energy, Sep. 2008, 9 pages, (available at http://www.pnl.gov/main/publications/external/technical_reports/PNNL-17831.pdf, last accessed on Aug. 24, 2011).

"BioFuels," IEA Views, pp. 1-3, (available at http://www.ieaorg/journalists/infocus.asp, last accessed on Aug. 24, 2011).

"Technology Roadmap: Carbon capture and storage," International Energy Agency, 52 pages, (available at http://www.iea.org/papers/2009/CCS_Roadmap.pdf, last accessed on Aug. 24, 2011).

Kenneth Möllersten, Jinyue Yan, and Jose R. Moreira "Potential market niches for biomass energy with CO2 capture and storage—Opportunities for energy supply with negative CO2 emissions," Original Research Article, Biomass and Bioenergy, vol. 25, Issue 3, Sep. 2003, pp. 273-285. (available at http://www.sciencedirect.com/science?_ob=ArticleURL&_udi=B6V22-487MW98-1&_user=10&_coverDate=09/30/2003&_rdoc=1&fmt=high&_orig=search&_origin=search&_sort=d&_docanchor=&view=c&_acct—C000050221&_version=1&_urlVersion=0&_userid=10&md5=7ac388b4a4c8b24fe2edc33566a3e2bb&searchtype=a, last accessed on Aug. 24, 2011).

"Carbondioxide Capture and Storage in the Clean Development Mechanism: Assessing Market Effects of Inclusion," Report No. 2008/13, Nov. 2008, 109 pages, (available at http://www.ieaghg.org/docs/general_publications/2008_13.pdf, last accessed on Aug. 24, 2011).

"Table 6. Carbon Intensity Lookup Table for Gasoline and Fuels that Substitute for Gasoline," Jan. 6, 2011, 8 pages (available at http://www.arb.ca.gov/fuels/lcfs/0106111cfs_lutables.pdf, last accessed on Aug. 24, 2011).

"LCFS Workgroups," California Environmental Protection Agency, Air Resources Board, Jul. 1, 2011, 2 pages, (available at http://www.arb.ca.gov/fuels/lcfs/workgroups/workgroups.htm#pathways, last accessed on Aug. 24, 2011).

"Carbon Intensities (CIs) and Other Information from Registered Biofuel Facilities," California Environmental Protection Agency, Air Resources Board, May 27, 2011 4 pages, (available at http://www.arb.ca.gov/fuels/lcfs/reportingtool/registeredfacilityinfo.htm, last accessed on Aug. 24, 2011).

Ning Zeng, "Carbon Sequestration Via Wood Burial," Carbon Balance and Management, Jan. 3, 2008, 3:1, pp. 1-12.

Thomas Garrett and William Walker, "An Investigation Into the Carbon Storage Potential of *Pinus radiata* Wood Processing Residue for Carbon Credits," Solid Energy, University of Canterbury, Oct. 5, 2009, pp. 1-62.

Adair et al., "The Effect of Wood Burial and Submersion on Decomposition: Implications for Reducing Carbon Emissions," 2010, 140 pages.

"Biochar Pathways for Different Environments," International Biochar Initiative, Aug. 26, 2009, 2 pages.

James S. Rhodes and David W. Keith, "Biomass With Capture: Negative Emissions Within Social and Environmental Constraints: And Editorial Comment," Climate Change, Doi 10.1007/S10584-9387-4, 8 pages.

David W. Keith and James S. Rhodes, Bury, Burn or Both: A Two-For-One Deal on Biomass Carbon and Energy: Reply to R.A. Metzger, G. Benford, and M.I. Hoffert, Climatic Change 54: 375-377, 2002.

"Dump Corn Stalks at Sea to Slow Global Warming?" The Christian Science Monitor, Feb. 11, 2009, 3 pages.

"An Introduction to Biochar: Concept, Processes, Properties, and Applications," Powerpoint Presentation of Jim Amonette, Pacific Northwest National Laboratory (Pnnl) on Jan. 25, 2009, 26 pages.

"Carbon Sequestration Opportunities with Biofuel Production," Powerpoint Presentation by Jim Amonette, Pacific Northwest National Laboratory (Pnnl) on Nov. 6, 2007, 24 pages (available at http://www.bioeconomyconference.org/07%20Sessions/approved07sessions/Amonette,%20Jim.pdf, last accessed on Aug. 25, 2011).

Jansson et al., "Phytosequestration: Carbon Biosequestration by Plants and the Prospects of Genetic Engineering," BioScience, Oct. 2010, vol. 60. No. 9 pp. 685-696, (available at http://www.aibs.org/bioscience-press-releases/resources/Jansson%20et%20al.pdf, last accessed on Aug. 25, 2011).

Johannes Lehmann, "A handful of carbon," Nature, vol. 447, No. 10, May 2007, pp. 143-144, (available at http://www.css.cornell.edu/faculty/lehmann/publ/Nature%20447,%20143-144,%202007%20Lehmann.pdf, last accessed on Aug. 25, 2011).

Johannes Lehmann, "Bio-energy in black," Front Ecol Environ, 2007, vol. 7. No. 7 pp. 381-387, (available at http://wiki.nscss.org/system/files/Lehmann2007.pdf, last accessed on Aug. 25, 2011).

Keil et al., "Burial of agricultural byproducts in the deep sea as a form of carbon sequestration: A preliminary experiment," Marine Chemistry vol. 122, 2010, pp. 91-95, (available at http://depts.washington.edu/aog/publications/Keileta12010MarChem.pdf, last accessed on Aug. 25, 2011).

Keil et al., "Burial of Agricultural Byproducts in the Deep Sea as a form of Carbon Sequestration" (Draft) (available at http://depts.washington.edu/aog/publications/Crops_manuscript_RKv5DRAFT.pdf, last accessed on Aug. 25, 2011).

"Hydrothermal carbonization (HTC): simply impressive", AVA-CO2 Schweiz AG, 2011, 13 pages, (available at http://www.ava-co2.com/web/pages/en/technology.php, last accessed on Aug. 25, 2011).

"Innovative Team Builds a Worldwide Novelty," Carbon Solutions—Hydrothermale Carbonisierung, 7 pages, (available at http://www.cs-carbonsolutions.de/htc-process.htm, last accessed on Aug. 25, 2011).

"Torrefaction," Biomass + Microwave Technology=BioCoal, 1 page, (available at http://canadian-biocoal.com/, last accessed on Aug. 25, 2011).

"Torrefaction," Wikipedia, 4 pages, (available at http://en.wikipedia.org/wiki/Torrefaction, last accessed on Aug. 25, 2011).

"The Case for Energy Densification of Biomass & The Advantage of the Rotawave Ties System," Rotawave Ltd., 4 pages, (available at http://canadian-biocoal.com/articles/Rotawave%20TIES%20system%20advantage%20Jun%202010%20_final_.pdf, last accessed on Aug. 25, 2011).

Florentinus, et al., "Worldwide Potential of Aquatic Biomass: Report Summary" ECOFYS, Jan.-May 2008, 11 pages, (available at http://www.ecofys.com/com/publications/brochures_newsletters/documents/worldwide_potential_aquatic_biomass_summary.pdf, last accessed on Aug. 25, 2011).

"Algae Based Co2 Capture—Live Projects," (Abstract), 1 page (available at http://www.powerplantccs.com/ccs/cap/fut/alg/alg_ccs_liveprojects.html, last accessed on Aug. 25, 2011).

"Algae based CO2 Capture," 1 page (available at http://www.powerplantccs.com/ccs/cap/fut/alg/alg.html, last accessed on Aug. 25, 2011).

"Comprehensive Guide for Algae-based CO2 Capture: The most comprehensive and detailed guide for the technology, processes and opportunities in the algae-based CO2 industry," (available at http://www.oilgae.com/ref/report/co2_capture/co2_capture.html, last accessed on Aug. 25, 2011).

Rooney et al., "Designing sorghum as a dedicated bioenergy feedstock," (Abstract) Biofuels, Bioproducts and Biorefining, vol. 1, Issue 2, pp. 147-157, Sep. 18, 2007 (available at http://onlinelibrary.wiley.com/doi/10.1002/bbb.15/abstract, last accessed on Aug. 25, 2011).

Mani et al., "Modeling of the Wet Storage of Biomass," American Society of Agricultural and Biological Engineers, Paper No. 061014, 2006 ASAE Annual Meeting 2006 (available at http://asae.frymulti.com/abstract.asp?aid=21443&t=1, last accessed on Aug. 25, 2011).

Kaliyan et al., "Roll Press Briquetting and Pelleting of Corn Stover and Switchgrass," Transactions of the ASABE. 52(2): 543-555, 2009 American Society of Agricultural and Biological Engineers (available at http://asae.frymulti.com/abstract.asp?aid=26812&t=1, last accessed on Aug. 25, 2011).

"Pre-treatment of Biomass," Pre-treatment of Biomass—Power Plant CCS, 1 page, (available at http://powerplantccs.com/ccs/cap/fut/bio/pre_treatment.html, last accessed on Aug. 25, 2011).

"Biofuel Beedstock Logistics: Recommendations for Research and Commercialization: A Report by the Feedstock Logistics Interagency Working Group," Nov. 2010, pp. 1-52, (available at http://www.usbiomassboard.gov/pdfs/biomass_logistics_2011_web.pdf, last accessed on Aug. 25, 2011).

Afzal et al., "Storage of Comminuted and Uncomminuted Forest Biomass and its Effect on Fuel Quality," Bioresources vol. 5 No. 1, pp. 55-69, (available at http://ojs.cnr.ncsu.edu/index.php/BioRes/article/view/BioRes_05_1_0055_Afzal_BSM_Storage_Comminuted_Biomass/487, last accessed on Aug. 25, 2011).

"Advancing a Biological Paradigm for Biomass Pretreatment," Powerpoint Presentation of Richard et al., 14 pages (available at http://openwetware.org/images/c/c6/IBE_2007_Richard.pdf, last accessed on Aug. 25, 2011).

"Classification and Application of Biomass Physical Properties in Harvesting and Preprocessing Systems", DOE/USDA Biomass Feedstock, Gate Review Meeting, Mar. 15, 2005, Powerpoint Presentation by Chris Wright, (available at http://feedstockreview.ornl.gov/pdf/wright/session3_wright.pdf, last accessed on Aug. 25, 2011).

"Post Harvest Physiology of Biomass Storage," DOE/USDA Biomass Feedstock, Gate Review Meeting, Mar. 16, 2005, Powerpoint Presentation by Corey W. Radtke, Idaho National Laboratory, (available at http://feedstockreview.ornl.gov/pdf/radtke/session4_radtke.pdf, last accessed on Aug. 25, 2011).

"Energy Densification via Hydrothermal Pre-Treatment of Cellulosic Biomass," AWMA International Specialty Conference: Leapfrogging Opportunities for Air Quality Improvement, May 10-14, 2010, Powerpoint Presentation by Hoekman et al., (available at http://www.dri.edu/images/stories/editors/leapfrog/techprog/Vg_1_Hoekman.pdf, last accessed on Aug. 25, 2011).

Hess et al., "Uniform-Format Bioenergy Feedstock Supply System Design Report Series," vol. A: "Uniform-Format" Vision and Conventional-Bale Supply System Design (DRAFT) Apr. 2009, p. 1-204 (available at https://inlportal.inl.gov/portal/server.pt/gateway/PTARGS_0_1829_63075_0_0_18/Uniform-Format_Feedstock_Revised_Draft.pdf, last accessed on Aug. 25, 2011).

Hess et al., "Uniform-Format Bioenergy Feedstock Supply System Design Report Series," vol. B: Pioneer Implementation of Uniform-Format Vision Apr. 2009, p. 1-109, "Commodity-Scale Production of an Infrastructure-Compatible Bulk Solid from Herbaceous Lignocellulosic" Biomass (available at https://inlportal.inl.gov/portal/server.pt/gateway/PTARGS_0_4791_72027_0_0_18/10-50899-01_Report%20Sec3.pdf, last accessed on Aug. 25, 2011).

Gnansounou, E., et al., "Life Cycle assessment of biofuels: Energy and greenhouse gas balances," Bioresource Technology 100, pp. 4919-4930, 2009.

International Search Report for PCT/US2011/045578, mailed Apr. 12, 2012, 4 pages.

International Search Report for PCT/US2011/045580, mailed Apr. 19, 2012, 4 pages.

* cited by examiner

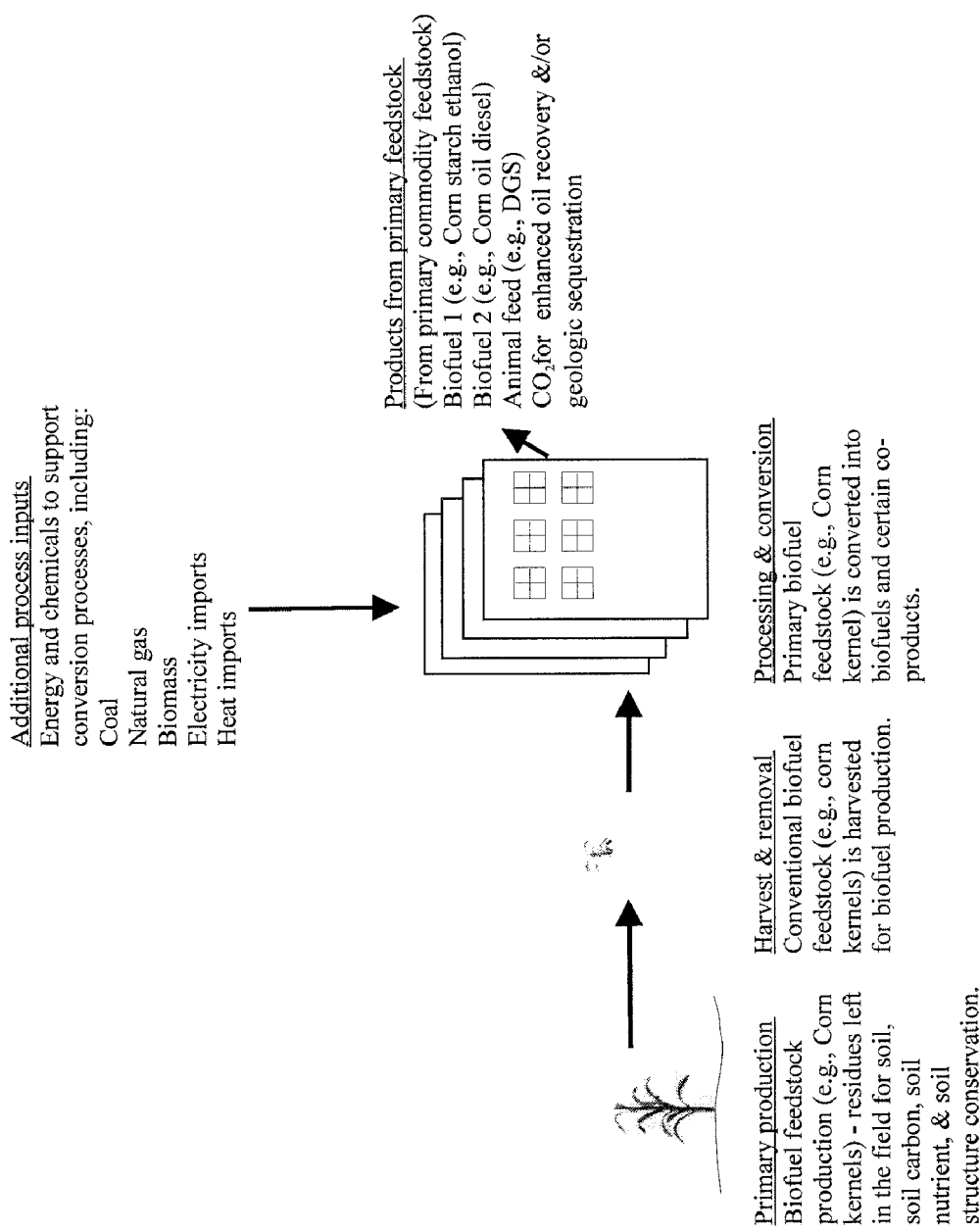

WHOLE CROP BIOFUEL PRODUCTION (WCBP)

CROSS REFERENCE TO RELATED APPLICATIONS

This application claims benefit of priority to U.S. Ser. No. 61/477,860, filed on Apr. 21, 2011, the disclosure of which is incorporated herein by reference in its entirety.

FIELD OF THE TECHNOLOGY

The invention relates generally to biofuel production. The invention relates more particularly to methods of accounting for carbon flows and determining a regulatory value for a biofuel, methods of engineering carbon cycles for biofuel production, and methods of manufacturing biofuels, as well as the biofuels and regulatory values derived therefrom.

BACKGROUND OF THE INVENTION

Carbon intensity (CI) is a fuel characteristic that is increasingly being measured and regulated in various jurisdictions within the U.S. and abroad (e.g., U.S. RFS2; LCFS in CA, BC, WA, OR, NEMA; EU-RED; UK-RTFO). CI can be used as a measure of net greenhouse gas emissions from across the fuel life cycle generally evaluated using lifecycle analysis (LCA) methods and specified per unit fuel energy, e.g., in units of gram CO2 equivalent emissions per mega-joule of fuel (gCO2$e$/MJ). For biofuels, carbon intensity measures can include emissions from sources associated with supplying inputs for agricultural production (e.g., fertilizers), fuel combustion, and certain or all process steps in between, which may be used to define a fuel production pathway, or simply a fuel pathway. LCA of carbon intensity can be set up as an accounting system with emissions to the atmosphere (e.g., combustion emissions) representing emissions accounting debits and flows from the atmosphere (e.g., carbon fixed from the atmosphere via photosynthesis) representing emissions accounting credits. The sign convention can be reversed relative to financial accounting, but this is how the terms are often used in practice.

SUMMARY OF THE INVENTION

LCA methods can be used to assess a variety of social and environmental performance characteristics of biofuels, which can collectively be referred to using the term sustainability. Biofuel sustainability characteristics or sustainability performance can be reflected within biofuel and related policy instruments (e.g., as a quantitative value associated with, or characterizing, the biofuel, as well as related standards), to provide a framework for avoiding potential negative consequences of expanding biofuel production.

The effects of using co-products from biofuel production can be reflected in evaluations of biofuel performance against sustainability metrics in methods similar to those used for carbon intensity measures. In other words, LCA can reflect emissions credits and debits accrued across the whole fuel production pathway or supply chain, including emissions effects of biomass carbon not converted into biofuels. This can be accomplished by providing a lifecycle emissions accounting credit to the product of interest (e.g., biofuel product) based on allocation of a fraction of lifecycle emissions (generally emissions associated with processes upstream of the material diversion for co-product use) to the various products (according to so called "allocation" accounting methodologies) or by providing lifecycle emissions accounting credits (or debits) for net emissions reductions (or increases) associated with use of the various co-products/by-products relative to use of more conventional products (according to so called "system expansion" accounting methodology).

So called first generation biofuels, which dominate the portfolio of currently available biofuels, are generally produced from starch, sugar, or lipid-rich portions of plants, such as oil seeds (e.g., canola), legumes (e.g., soybeans), cereal grains (e.g., corn or wheat), sugar cane, and other similar plant matter (e.g., sorghum, sugar beet, and the like). Strategies for reducing the carbon intensity and improving the sustainability performance of such biofuels, including efforts to reduce agricultural inputs to production, use low carbon resources to supply energy required to convert biomass feedstock into biofuel, employ supply chain optimization to reduce emissions from feedstock and product transport, and integrate multiple co-products in converting biomass feedstock to biofuels would be advantageous.

Because first generation biofuel production systems are only capable of converting starch, sugar, or lipid rich portions of crop biomass (e.g., corn kernels, soybeans, canola seeds, etc.) into biofuels, they inherently involve production of substantial quantities of agricultural residues (e.g., stalks, stems, leaves, corn cobs, husks, shells, etc.). Agricultural residues can be a potential energy, chemical, and carbon resource. While substantial quantities of these resources are produced within first generation biofuel supply chains, strategies to reduce the carbon intensity of first generation biofuels do not include utilization of these agricultural residues (e.g., by mitigating anthropogenic greenhouse gas emissions and coupling the mitigation to a biofuel, thereby producing a biofuel having a more favorable regulatory value). Instead, these agricultural residues are typically included in LCA measures of biofuel carbon intensity with the assumption that their carbon is emitted back to the atmosphere in the form of CO2 (balancing a portion of atmospheric carbon fixed via photosynthesis during crop production). As such, the carbon value—as well as potential energy or chemical values—of these resources is not realized in first generation biofuel production systems or associated LCAs.

Certain first generation-type biofuel production processes can be combined with agricultural residue use, for example, to supply energy to the feedstock to biofuel conversion process. For example, a first generation-type biofuel production process could use biomass (alone or in combinations with other energy sources) to supply heat and/or power for biofuel production. However, agricultural residue from biofuel feedstock production is not generally used for such purposes because the opportunities for such integration would be necessarily limited by quantities and feedstock characteristics of the agricultural residues, the operational requirements of the conversion system, and by requirements to transport both the biofuel feedstock and the agricultural residue to the biofuel production facility, which can be compromised by characteristics of the agricultural residues (e.g., low bulk and energy densities). Rather, alternate biomass resources can be applied for this purpose with potentially simpler logistics requirements and superior technical performance (e.g., burning woody biomass or agricultural residues supplied from locations closer to the biofuel plant). In contract, the invention provides methods for mitigating anthropogenic greenhouse gas emissions and coupling the mitigation to a biofuel, thereby producing a biofuel having a more favorable regulatory value than first generation-type biofuels.

Numerous technologies exist independently, and more are being researched and developed, for using agricultural residues to produce energy products, chemicals, plastics, soil amendments, and/or to sequester biomass carbon away from the atmosphere for timescales relevant for advancing climate policy objectives. Such technologies have the potential to enable agricultural residues to displace conventional fossil hydrocarbon products (e.g., produced using fossil fuels or fossil hydrocarbon feedstock), generate emissions offsets, or otherwise generate emissions credits or other sustainability benefits within lifecycle accounting frameworks and/or within certain regulatory frameworks. The invention provides for the integration of systems capable of utilizing agricultural residues resulting as a consequence of first generation biofuel feedstock production, thereby enabling the production of biofuels with substantially lower carbon intensities due to the effective utilization of the whole crop. This integration is a feature of the invention, which is termed here as Whole Crop Biofuel Production ("WCBP").

Agricultural residues have been separately evaluated, along with dedicated energy crops (e.g., switchgrass, miscanthus, poplar, and the like), as a feedstock for so called cellulosic (AKA second generation or ligno-cellulosic) biofuel production. LCA carbon intensity measures for cellulosic biofuels benefit from several characteristics of their production systems. One benefit, which contrasts with existing first generation biofuel production systems, is that the production process involves processing the feedstock biomass in its entirety—there is effectively no agricultural residue (or agricultural residues from other production systems are used as feedstock for biofuel production). This is a substantial benefit because it enables all of the photosynthetic activity associated with feedstock production to be leveraged in the biofuel production system, as opposed to only the portion associated with sugar, starch, or lipid rich biomass used in first generation biofuel production systems.

While cellulosic production systems can process the whole biomass, only a certain fractions of it (e.g., the cellulosic and hemi-cellulosic fractions in fermentation based systems) can be converted to biofuel. The balance (e.g., composed of lignin biomass fractions and residues from fermentation) can be burned to provide process heat and power. Such heat and power can exceed facility process requirements and the excess can be exported to the local power grid. LCA measures of carbon intensity therefore can include an LCA emissions accounting credit (e.g., carbon credit) for electricity exports as a co-product of biofuel production (e.g., cellulosic biofuel production). WCBP also provides for the analogous utilization of biomass fractions not suitable for conversion to biofuel produced in first generation production systems (e.g., agricultural residues) within the context of LCAs and/or carbon intensity measures.

For the purpose of measuring lifecycle carbon intensity there is generally no difference between co-products produced in the biofuel conversion process (e.g., electricity exports from lignin combustion in cellulosic biofuel conversion processes) and those produced at other points in the supply chain (e.g., electricity exports from combustion of agricultural residues produced as a consequence of first generation biofuel feedstock production). Similar LCA emissions accounting credits should be assigned to both. (e.g., accounting credits should be equal on a per kilowatt hour basis, but should also reflect relative quantities of electricity produced per unit of biofuel and potentially different greenhouse gas emissions associated with electricity displaced in different locations.) As a practical matter, however, production of such co-products can involve different processes, technologies, supply chains, and management systems.

The potential for utilization of agricultural residues produced as a consequence of first generation biofuel feedstock production to provide LCA emissions accounting credits in biofuel carbon intensity calculations and improve biofuel sustainability performance has not previously been recognized. As such, production systems that leverage this potential to maximize the value of the whole crop in biofuel production—including fuel, co-product, carbon, and sustainability performance—have not been disclosed, proposed, or developed. In various aspects and embodiments, the invention includes such production systems and methods, as well as the resulting biofuels (and co-products) having reduced carbon intensity and improved sustainability performance.

In one aspect, the invention provides a computerized method of using a data processor having a memory to account for carbon flows and determine a regulatory value for a biofuel. The method includes (i) storing, in memory, a first set of one or more carbon flow values characterizing the production and use of a biofuel derived from a first fraction of an agricultural biomass; (ii) storing, in memory, a second set of one or more carbon flow values characterizing the production and use of a co-product from a second fraction of the agricultural biomass, wherein the second fraction comprises an agricultural residue and wherein the co-product mitigates anthropogenic greenhouse gas emission; and (iii) calculating, using the data processor, a regulatory value for the biofuel from the first and second sets of carbon flow values.

In another aspect, the invention provides a method of engineering a carbon cycle for biofuel production and use. The method includes arranging the production of a biofuel from a first fraction of an agricultural biomass and the production of co-product from a second fraction of the agricultural biomass, wherein the second fraction comprises an agricultural residue, thereby mitigating anthropogenic greenhouse gas emission. The method also includes assigning a regulatory value to the biofuel from a first set of one or more carbon intensity values characterizing the production and use of the biofuel, and a second set of one or more carbon intensity value characterizing the production and use of the co-product.

In yet another aspect, the invention provides a method of manufacturing a biofuel. The method includes producing a biofuel from a first fraction of an agricultural biomass and producing a co-product from a second fraction of the agricultural biomass, wherein the second fraction comprises an agricultural residue and wherein the co-product mitigates anthropogenic greenhouse gas emission. The method also includes assigning the biofuel a regulatory value based upon a first set of one or more carbon intensity values characterizing the production and use of the biofuel and a second set of one or more carbon intensity value characterizing the production and use of the co-product.

In still another aspect, the invention provides a computerized method of using a data processor having a memory to account for carbon flows and determine a regulatory value for a biofuel. The method includes (i) storing, in memory, a first set of one or more carbon flow values characterizing the production and use of a biofuel derived from a first fraction of an agricultural biomass, (ii) storing, in memory, a second set of one or more carbon flow values characterizing the production and use of a co-product from a second fraction of the agricultural biomass, wherein the second fraction comprises an agricultural residue and wherein the co-product mitigates anthropogenic greenhouse gas emission, (iii) calculating, using the data processor, a regulatory value for the biofuel from the first and second sets of carbon flow values, and (iv) trading the biofuel having the regulatory value, a tradable credit generated as a function of the regulatory value, or both the biofuel and the tradable credit. The co-product displaces a fossil hydrocarbon product, thereby preventing carbon from a fossil hydrocarbon product from flowing to the atmosphere.

In still another aspect, the invention provides a method of engineering a carbon cycle for biofuel production and use. The method includes (i) arranging the production of a biofuel from a first fraction of an agricultural biomass and the production of co-product from a second fraction of the agricultural biomass, wherein the second fraction comprises an agricultural residue, thereby mitigating anthropogenic greenhouse gas emission, (ii) assigning a regulatory value to the biofuel from a first set of one or more carbon intensity values characterizing the production and use of the biofuel, and a second set of one or more carbon intensity value characterizing the production and use of the co-product, and (iii) trading the biofuel having the regulatory value, a tradable credit generated as a function of the regulatory value, or both the biofuel and the tradable credit. The co-product displaces a fossil hydrocarbon product, thereby preventing carbon from a fossil hydrocarbon product from flowing to the atmosphere.

In still another aspect, the invention provides a method of manufacturing a biofuel. The method includes (i) producing a biofuel from a first fraction of an agricultural biomass, (ii) producing a co-product from a second fraction of the agricultural biomass, wherein the second fraction comprises an agricultural residue and wherein the co-product mitigates anthropogenic greenhouse gas emission, (iii) assigning the biofuel a regulatory value based upon a first set of one or more carbon intensity values characterizing the production and use of the biofuel and a second set of one or more carbon intensity value characterizing the production and use of the co-product, and (iv) trading the biofuel having the regulatory value, a tradable credit generated as a function of the regulatory value, or both the biofuel and the tradable credit. The co-product displaces a fossil hydrocarbon product, thereby preventing carbon from a fossil hydrocarbon product from flowing to the atmosphere.

In still another aspect, the invention provides a method including (i) receiving a biofuel feedstock produced from a first fraction of an agricultural biomass, wherein the biofuel feedstock has an associated co-product produced from a second fraction of the agricultural biomass comprising an agricultural residue and wherein the co-product mitigates anthropogenic greenhouse gas emissions and (ii) producing a low carbon fuel derived from the biofuel feedstock, wherein the low-carbon fuel comprises a transportation fuel having a LCA emissions accounting credit based at least in part on a fuel pathway comprising the production of said co-product.

In still another aspect, the invention provides a method including (i) receiving a biofuel produced from a first fraction of an agricultural biomass, wherein the biofuel has an associated co-product produced from a second fraction of the agricultural biomass comprising an agricultural residue and wherein the co-product mitigates anthropogenic greenhouse gas emissions and (ii) providing the biofuel as a low carbon biofuel, wherein the low-carbon biofuel comprises a transportation fuel having a LCA emissions accounting credit based at least in part on a fuel pathway comprising the production of said co-product.

In still another aspect, the invention provides a method of processing biomass produced within a biofuel supply chain, but not converted into a biofuel, to reduce anthropogenic greenhouse gas emissions, such that resulting reductions in anthropogenic greenhouse emissions can be assigned to the biofuel supply chain or biofuel produced in the biofuel supply chain.

In still another aspect, the invention provides a method of providing a biofuel having a reduced carbon intensity value by (i) purchasing a biofuel produced from a first fraction of biomass, wherein the biofuel has an associated co-product produced from a second fraction of the agricultural biomass comprising an agricultural residue and wherein the co-product mitigates anthropogenic greenhouse gas emissions, (ii) assigning a carbon intensity value that reflects a LCA emissions accounting credit for mitigating anthropogenic greenhouse gas emissions, and (iii) selling at least one of the biofuel and a tradable credit defined as a function of the carbon intensity value.

In still another aspect, the invention provides a method of providing a biofuel having a reduced carbon intensity value by (i) purchasing feedstock for biofuel production that represents a first fraction of an agricultural biomass, wherein the biofuel has an associated co-product produced from a second fraction of the agricultural biomass comprising an agricultural residue and wherein the co-product mitigates anthropogenic greenhouse gas emissions, (ii) assigning a carbon intensity value that reflects a LCA emissions accounting credit for mitigating anthropogenic greenhouse gas emissions, and (iii) and selling at least one of the biofuel and tradable credit defined as a function of the carbon intensity value.

In still another aspect, the invention provides for biofuels, co-products, and/or tradable credits produced according to any of the methods of the invention.

In various embodiments, the co-product includes one or more of electricity, heat, and power. Producing the co-product can include producing electricity from a combination of second fraction and coal. The co-product can include one or more of a cellulosic biofuel, solid biofuel, bio-char, bio-chemical, bio-plastic, building material, construction material, paper pulp, animal feed, and soil amendment.

In some embodiments, the co-product prevents carbon from the second fraction from flowing to the atmosphere.

In certain embodiments, the co-product is a substitute for a fossil hydrocarbon product, thereby preventing carbon from a fossil hydrocarbon product from flowing to the atmosphere.

In various embodiments, the method includes trading the biofuel having the regulatory value, a tradable credit generated as a function of the regulatory value, or both the biofuel and the tradable credit. A method can include completing a transaction to sell a low carbon fuel to a transportation fuel provider.

In some embodiments, the greenhouse gas emission comprises carbon emission. In general, greenhouse gas can include any one or more gasses that in the atmosphere absorbs and emits radiation within the thermal infrared range. Greenhouse gas emission can include, for example, the emission of any one or more of: carbon dioxide, methane, nitrous oxide, and ozone.

It is understood by those skilled in the art that the various aspects and features described herein can be adapted and combined with the various embodiments of the invention. The advantages of the technology described above, together with further advantages, may be better understood by referring to the following description taken in conjunction with the accompanying drawings. The drawings are not necessarily to scale, emphasis instead generally being placed upon illustrating the principles of the technology.

DESCRIPTION OF THE DRAWINGS

FIGS. 2A and 2B show examples of biofuel production and FIG. 2C shows an example WCBP, in the context of corn and corn ethanol.

The invention will now be described in detail with respect to the preferred embodiments and the best mode in which to make and use the invention. Those skilled in the art will recognize that the embodiments described are capable of being modified and altered without departing from the teachings herein.

DETAILED DESCRIPTION OF THE INVENTION

The invention, including WCBP, provides methods of accounting for carbon flows and determining a regulatory value for a biofuel, method of engineering carbon cycles for biofuel production, and methods of manufacturing biofuels, as well as the biofuels and regulatory values derived therefrom. For example, the invention includes integrated systems, processes, and methodologies for producing biofuels, including first generation biofuels, with substantially reduced net greenhouse gas emissions and carbon intensities and substantially improved sustainability performance (e.g., relative to conventional biofuels). In various embodiments, WCBP can include various combinations of four general components: (i) agricultural production; (ii) biofuel production; (iii) agricultural residue utilization; and (iv) greenhouse gas accounting and/or sustainability assessment, in which utilization of a fraction of the biomass (e.g., agricultural residue) provides LCA emissions accounting credits and/or sustainability benefits to be associated with the biofuel product. These components can be interrelated and/or integrated (e.g., in a single supply/production chain).

Figure 1A:
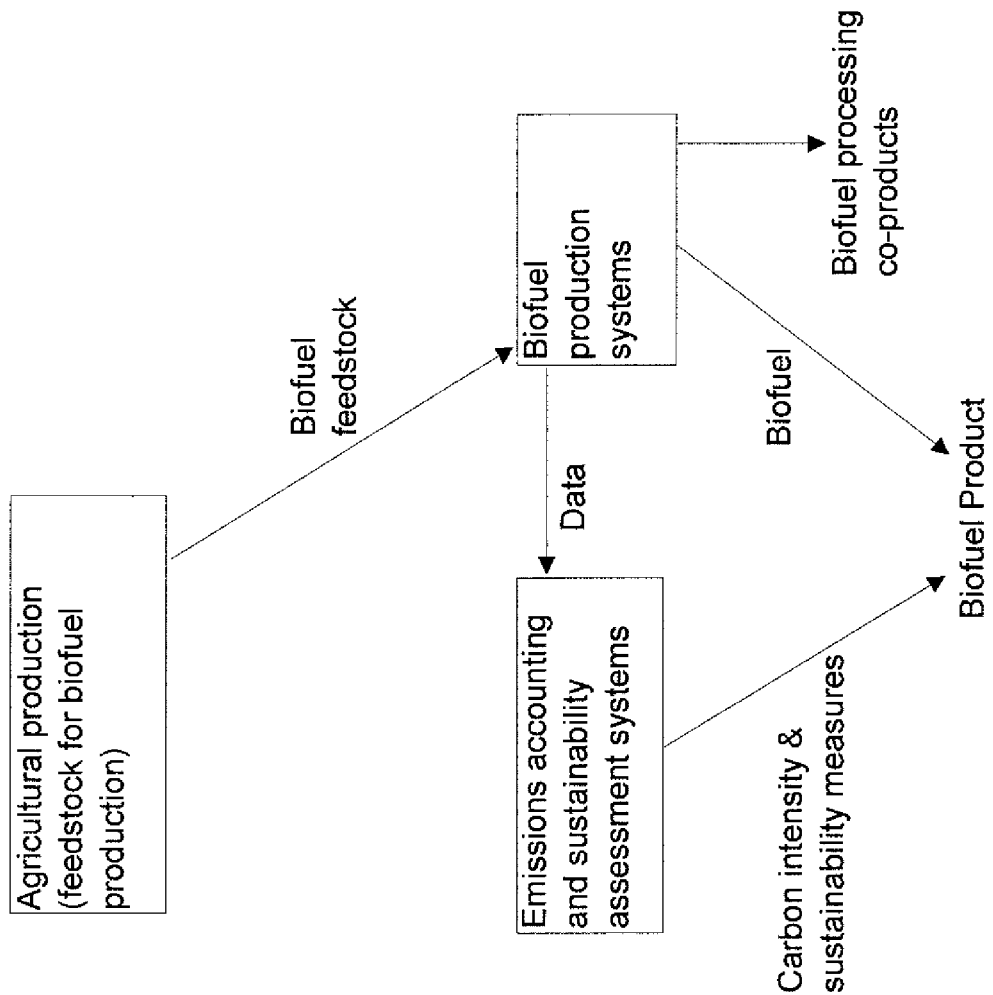
FIG. 1A shows an example biofuel production process schematic and FIG. 1B shows an example WCBP process schematic.
Figure 1B:
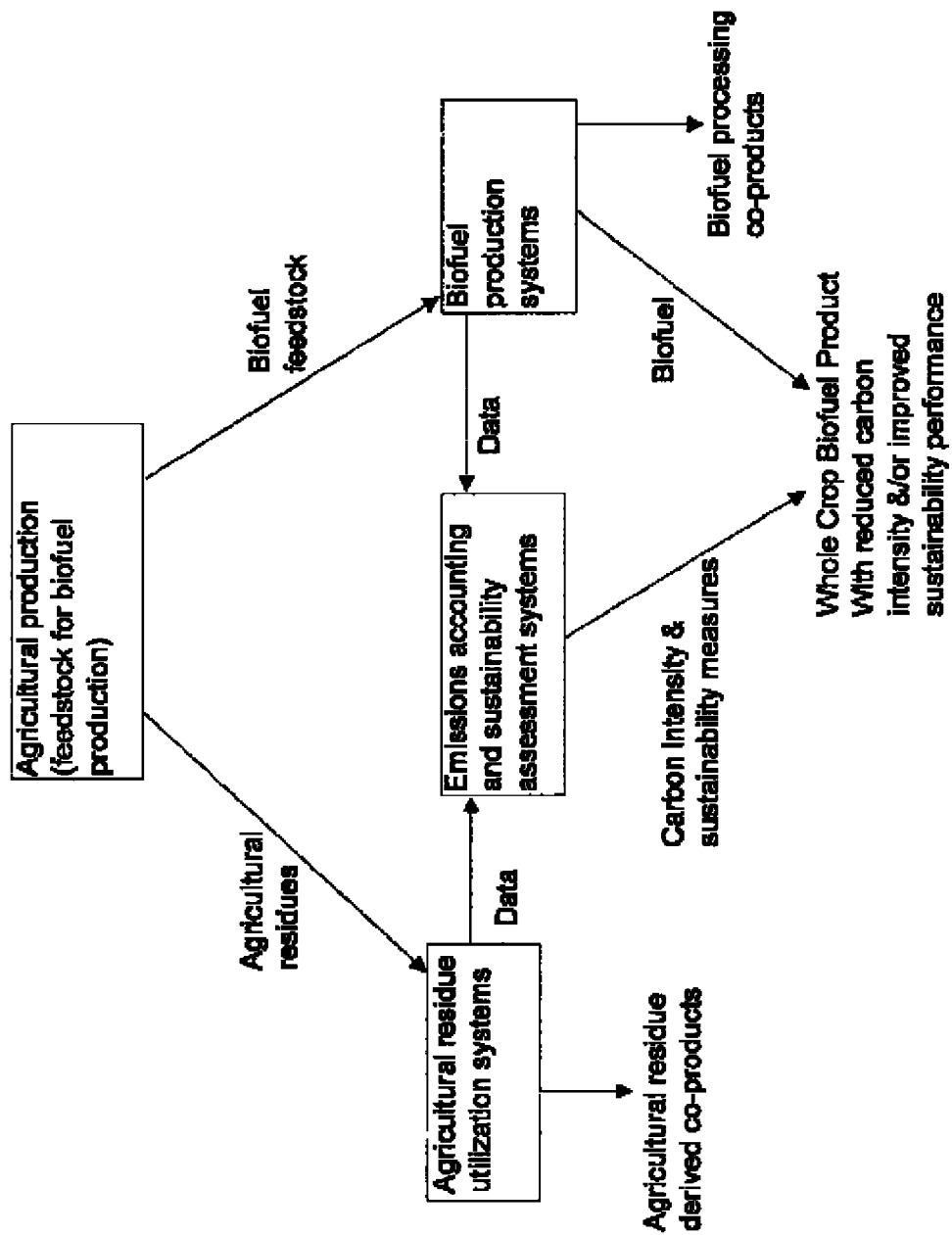

FIG. 1A shows an example biofuel production process schematic and FIG. 1B shows an example WCBP process schematic. In FIG. 1A, agricultural production produces a biofuel feedstock, which is then processed in a biofuel production system. In general, biofuel production results in a biofuel and data that can be assessed for CI and/or sustainability measures. The data can include agricultural production data that can be assessed for CI and sustainability measures. For example, the data can come only from biofuel production (with predefined values and/or assumptions regarding agricultural production and fuel use), or can come from the biofuel production, agricultural production, and fuel use. These measures can be used to define credits or debits, including tradable credits under certain regulatory frameworks. Note that tradable credits can be distinct from LCA accounting credits in their ability to be explicitly traded (e.g., bought and sold) under certain regulatory frameworks. The combination of these measures, or tradable credits or debits associated with these measures, and the biofuel can be traded as a biofuel product. In some cases, the biofuel and tradable credits, in whole or in part, can be traded separately. In a conventional system, biofuel co-products are generally limited to biofuel processing co-products (e.g., ethanol from the fermentation of corn kernels and animal feed from the corn kernel fermentation waste). In the illustrated embodiment, the WCBP process schematic FIG. 1B further shows agricultural residues being processed in an agricultural residue utilization system. The utilization of agricultural co-products produces agricultural residue derived co-products and co-product data that can also be assessed for CI and/or sustainability measures. Accordingly, the WCBP biofuel product can have a reduced carbon intensity and/or improved sustainability measure relative to the conventional process (e.g., even give the same agricultural production input and biofuel production system).

In one aspect, the invention provides a computerized method of using a data processor having a memory to account for carbon flows and determine a regulatory value for a biofuel. The data processor can be essentially any device, including a personal computer, an electronic device such as a smartphone or tablet, a customized or purpose-built machine, and the like. The method includes storing, in memory, a first set of one or more carbon flow values characterizing the production and use of a biofuel derived from a first fraction of an agricultural biomass. The method also includes storing, in memory, a second set of one or more carbon flow values characterizing the production and use of a co-product from a second fraction of the agricultural biomass, wherein the second fraction comprises an agricultural residue and wherein the co-product mitigates anthropogenic greenhouse gas emission. Additionally, the method includes calculating, using the data processor, a regulatory value for the biofuel from the first and second sets of carbon flow values.

In another aspect, the invention provides a method of engineering a carbon cycle for biofuel production and use. The method includes arranging the production of a biofuel from a first fraction of an agricultural biomass and the production of co-product from a second fraction of the agricultural biomass, wherein the second fraction comprises an agricultural residue, thereby mitigating anthropogenic greenhouse gas emission. The method also includes assigning a regulatory value to the biofuel from a first set of one or more carbon intensity values characterizing the production and use of the biofuel, and a second set of one or more carbon intensity value characterizing the production and use of the co-product.

In yet another aspect, the invention provides a method of manufacturing a biofuel. The method includes producing a biofuel from a first fraction of an agricultural biomass and producing a co-product from a second fraction of the agricultural biomass, wherein the second fraction comprises an agricultural residue and wherein the co-product mitigates anthropogenic greenhouse gas emission. The method also includes assigning the biofuel a regulatory value based upon a first set of one or more carbon intensity values characterizing the production and use of the biofuel and a second set of one or more carbon intensity value characterizing the production and use of the co-product.

In general, a first fraction of the biomass can be a fraction of the biomass that is used as a biofuel feedstock (e.g., lipid and/or carbohydrate rich fraction in the example of a first generation biofuel). In general, the second fraction of the biomass can be a fraction of the biomass that is not used as a biofuel feedstock (though, in some embodiments, the second fraction can also be a biofuel feedstock, e.g., for a cellulosic biofuel). In various embodiments, the second fraction is or comprises an agricultural residue. The term agricultural residues is used here to describe biomass produced in agriculture, silviculture, and or aquaculture systems that is typically or historically not of sufficient value to be converted into salable product(s) and is therefore historically allowed to decompose in natural or modified environments (e.g., in the field, in compost, etc.), burned, or used as fodder or bedding in animal husbandry. Agricultural residues can be separated from the primary biofuel feedstock during harvesting (e.g., stalks, stems, leaves, etc.) or in post-harvest processing (e.g., shells, pods, hulls, etc.).

In general, the invention can be carried out by a single entity executing, arranging for and/or providing for the execution of the individual steps. For example, the single entity can contract for the completion of one or more individual steps (e.g., agricultural production, biofuel production, agricultural residue utilization, and/or greenhouse gas accounting and/or sustainability assessment). In some embodiments, the single entity might employ a preexisting framework or registration in carrying out the method (e.g., purchase a biofuel feedstock with an established CI and/or sustainability measure, or produce a biofuel with an established CI and/or sustainability measure) rather than ascertaining values for components of the pathway from scratch. Therefore, although the method integrates a wide variety of features from a long and complex supply chain/carbon cycle, the method is readily implemented by a single entity. For example, in the context of markets resulting from GHG/biofuel regulatory instruments and environments, several potential implementation models could be used to support WCBP. Potential implementation models can be differentiated based on the point in the supply chain responsible for WCBP implementation.

Implementation by independent operators. WCBP can be implemented by an independent operator based on the value of resulting tradable credits. In this case, the WCBP operator could purchase biomass and/or agricultural residues from biomass producers, process the biomass and/or agricultural residues (e.g., into a biofuel and co-product, or a co-product) and, qualify LCA emissions accounting credits under any or all relevant regulatory frameworks, market resulting tradable credits to regulated parties. One variant of this case could be for the WCBP operator to partner with a regulated party with standing under certain regulatory instruments (e.g., a biofuel producer regulated under a low carbon fuels standard) to qualify LCA emissions accounting credits and resultant tradable credits from WCBP implementation.

Implementation by regulated parties. WCBP can be implemented by a party with compliance requirements under one or more relevant regulatory frameworks (e.g., biofuel producer obligated under a low carbon fuel standard) based on the value of resulting tradable credits or allowances to the firm or on associated emissions trading markets. In this case, the regulated party could purchase biomass for WCBP jointly with or independently from their purchases of other biomass feedstock (e.g., agricultural residues along with corn kernels or soybeans for biofuel production). They could take responsibility for all of the processes mentioned above, but would have the additional options of retaining resulting tradable credits for their own compliance purposes or marketing them with their other products (e.g., biofuel) to regulated parties downstream in the supply chain in order to benefit from potential price premiums for low carbon products.

Implementation by biomass producers. WCBP can be implemented by a biomass producer. In many cases, resulting implementation models would be analogous to implementation by an independent operator. However, biomass producers implementing WCBP on biomass resulting as a co-product to primary biomass products (e.g., agricultural residues from production of feedstock for biofuel production) could profit from price premiums for primary products associated with lower embodied carbon emissions instead of qualification of LCA emissions accounting credits and sale of resulting tradable credits. This implementation model could be implemented in a stand-alone manner by biomass producers or in partnership with independent WCBP operators, regulated parties (e.g., biofuel producers), or both to leverage the particular contributions of each party (e.g., specialization of WCBP operators and regulatory standing of regulated parties).

Whole Crop Biofuel production systems are differentiated from other existing and proposed biofuel production systems in their utilization of the whole crop's biomass to maximize financial, environmental, climate, and other sustainability benefits, which can be relevant in a number of contexts, including for example evolving regulatory frameworks for advancing climate policy objectives. Relative to other existing and proposed biofuel production systems it can be viewed as: (i) systematically expanding process inputs and materials handling in the biofuel production systems to the whole crop biomass produced, rather than only starch, sugar, cellulosic, or lipid rich portions; (ii) balancing the expanded mix of products and co-products enabled by utilizing the whole crop biomass to maximize financial, climate, environmental, and sustainability benefits; and (iii) explicitly integrating the expanded product mix in lifecycle assessments of sustainability, environmental performance, greenhouse gas emissions, and carbon intensity to (a) substantially advance sustainability performance, (b) maximize potential emissions reductions, and (c) concentrate LCA accounting credits for such sustainability and emissions benefits on biofuel product(s), which can be associated with markets where the value of such emissions accounting credits, or resultant tradable credits, is expected to be particularly high. Examples include but are not limited to markets for low carbon biofuels and tradable credits issued for compliance with low carbon fuel standards.

Whole Crop Biofuels are fundamentally different in character from those resulting from other existing or proposed biofuel production systems with respect to unit-specific greenhouse gas emissions, also known as their carbon intensity, a measurable and regulated fuel property, and with respect to other potential metrics of biofuel sustainability adopted for regulatory or other purposes. Examples include those being developed or considered under low carbon fuel standards in California, Oregon, Washington, British Columbia, and a coalition of states in the Northeast and Mid-Atlantic region, the European Union's Renewable Energy and Fuel Quality Directives, and the United Kingdom's Renewable Transport Fuel Obligation.

Certain distinctions between Whole Crop Biofuel Production and conventional biofuel production are shown in FIGS. 1A and 1B. FIG. 2 shows certain other distinctions. FIG. 2A shows an example of conventional biofuel production and FIG. 2C shows an example WCBP, in the context of corn and corn ethanol.

FIG. 2A shows an example of conventional biofuel production from corn with lifecycle carbon intensity reductions and sustainability benefits from (i) co-products of converting primary biofuel feedstock and (ii) use of reduced carbon intensity process inputs (e.g., natural gas &/or biomass fuel for process heat and power requirements).

Figure 2B:
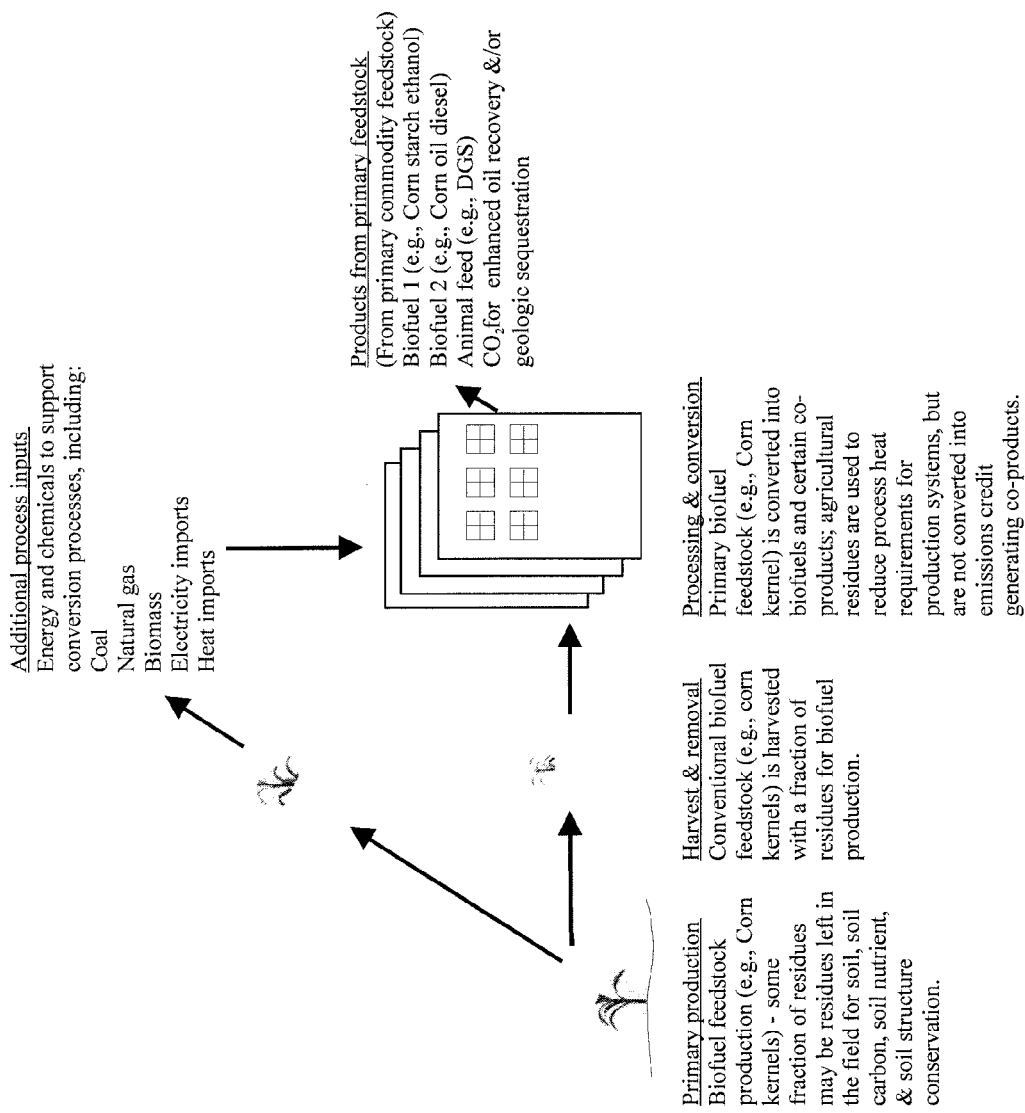

FIG. 2B shows an example of biofuel production from corn, with agricultural residues used for process heat and power. Biofuel production can include additional lifecycle carbon intensity reductions and sustainability benefits from the use of agricultural residues as low carbon intensity process inputs (e.g., corn stover biomass utilization for process heat and power requirements in ethanol production).

Figure 2C:
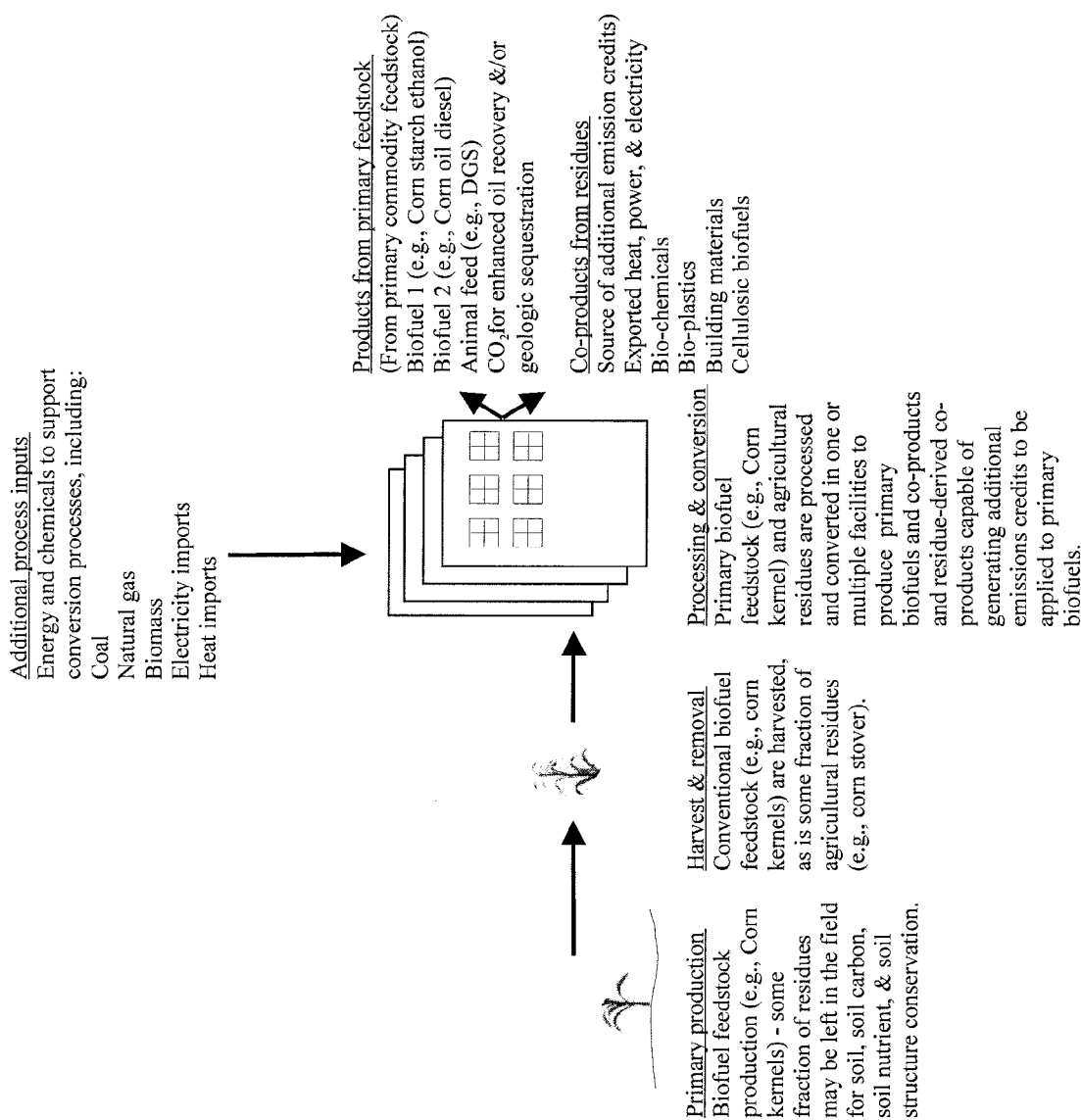

FIG. 2C shows an example of WCBP. Biofuel production can include additional lifecycle carbon intensity reductions and sustainability benefits from the utilization of the whole crop biomass, including co-products from agricultural residue utilization. Note that the example of WCBP differs from the conventional production in that (i) a second fraction of the agricultural biomass is harvested and removed for processing and conversion, (ii) processing and conversion of the second fraction of the agricultural biomass includes the production of co-products, and (iii) the co-products result in a biofuel having an improved CI and/or sustainability value.

Whole Crop Biofuel Production is not limited to the examples of corn ethanol shown in FIGS. 1 and 2. Selected additional examples are shown in Tables 1, 2, and 3 and Exhibit A. More generally, a person of ordinary skill in the art would understand, for example, that Whole Crop Biofuels can be differentiated from other biofuels based upon their unique mixes of products and co-products enabled by utilization of the whole crop, including agricultural residues, as indicated in associated carbon intensity measures and sustainability assessments. Such expanded product and co-product mixes can provide substantially improved sustainability performance and substantially reduced carbon intensities relative to biofuels produced with other existing or proposed production systems.

Although many of the individual component technologies required for implementing Whole Crop Biofuel Production have been developed and published, their integration into a production system capable of providing reduced carbon intensity biofuels and/or increased sustainability biofuels has not been previously disclosed, taught, or suggested. For example, WCBP has not been discussed in connection with discussion of biofuel carbon intensity reduction strategies despite the large emphasis placed on developing such strategies, for liquid fuels in general and biofuels in particular. This emphasis on carbon intensity reductions has contributed to the emergence of low carbon fuel standards in multiple jurisdictions within the U.S. and abroad as a strategy for reducing greenhouse gas emissions from liquid fuels. Such regulatory frameworks are expected to provide very strong incentives for supplying reduced carbon intensity biofuels and have generated strong opposition from industry participants that will be regulated under them. The associated controversy has brought measures of biofuel carbon intensity under intense scrutiny and has motivated substantial investment and enquiry by parties in industry, government, and academia alike into strategies for reducing the carbon intensity of biofuels. Industry has invested considerably in applying for the right to adopt reduced carbon intensity values for their biofuels on the basis of unique aspects of their production systems. Despite this high interest and expectations for strong policy incentives and high financial value, nowhere has the potential for Whole Crop Biofuels been publically disclosed, developed, or even discussed conceptually. Moreover, none of the carbon intensity values applied for by industry based on proprietary production systems are sufficiently low to reflect Whole Crop Biofuel Production. This cannot be disregarded as a minor omission in the various venues of debate or an accidental oversight given (i) the intensity of controversy surrounding low carbon fuel standards, related initiatives to regulate fuel carbon intensity, and associated carbon intensity measures for biofuels; (ii) the expected value of developing reduced carbon intensity biofuel production systems; and (iii) the potentially dramatic reductions in biofuel carbon intensity that can be achieved via Whole Crop Biofuel Production.

It should be noted that due to the nature of agricultural, biofuel, and co-product production systems, Whole Crop Biofuel Production can be implemented at one or more facilities, at one or more locations, and/or in one or more jurisdictions owned by one or more parties. Regardless of the distribution of the production system components in these and other dimensions, Whole Crop Biofuels can be identified and differentiated from other biofuels by the greenhouse gas emissions accounting used to evaluate fuel carbon intensity and by the sustainability assessments used to evaluate sustainability performance. In particular, the LCA emissions accounting credits associated with co-products resulting from agricultural residue utilization that are attributed to the biofuel can be used to indicate utilization of Whole Crop Biofuel Production. Any biofuel with a carbon intensity measure and or sustainability assessment that reflects the unique product mixes available under Whole Crop Biofuel Production systems can be by definition a Whole Crop Biofuel and, therefore, the subject of the invention.

Agricultural production includes the production of feedstock for biofuel production by conventional or novel agriculture, silviculture, aquaculture systems, and the like. Many alternate feedstock types and feedstock production systems can be utilized in the production of Whole Crop Biofuels. Potential feedstock include, but are not limited to: corn; wheat; sugar cane; sugar beet; soybean; canola; camolina; rapeseed; jatropha; mahua; mustard; flax; sunflower; palm; hemp; field pennycress; pongamia pinnata; algae; switchgrass; miscanthus; poplar; willow; timber; or residues from biomass intensive industries. The production system can be similar to that employed in the production of conventional agriculture, silviculture, or aquaculture products and commodities or can be modified via various techniques with respect to agricultural commodity yields, agricultural residue yields, soil carbon sequestration, nutrient/fertilizer inputs, water requirements or other operational parameters or co-benefits of agricultural production systems. Such modifications can include, but are not limited to, adoption of low or no till agriculture, retention of a fraction of agricultural residues to support soil fertility, application of bio-char produced from agricultural residues or other sources, or utilization of advanced crop strains, for example.

Agricultural production in Whole Crop Biofuel production systems can be differentiated from other existing or proposed production systems in that the whole crop biomass, including agricultural residues, are utilized to enable maximization of financial and environmental benefits of the integrated biofuel production system. In other words, agricultural production in Whole Crop Biofuel Production includes utilization of both the feedstock for primary biofuel production (e.g., corn kernels, soy beans, oil seeds, sugar canes, and the like) and portions that are not destined for conversion to primary biofuels, referred to herein as agricultural residues. That being said, the proportion of whole crop biomass, including agricultural residues, removed can be less than 100%. This proportion can be varied to balance financial and environmental benefits from products and co-products, environmental performance, soil fertility, or other considerations. As such, the proportion of agricultural residue biomass removed can depend on, among other things: the production system; the crop; agricultural, silviculture, or aquaculture management practices (e.g., the extent of tillage, application of fertilizers or other soil amendments, including bio-char or biocoal produced from agricultural residues or other sources, etc.); soil conditions; other environmental factors; and other considerations. All else being equal, the proportion of residues removed can vary across locations, crops, management systems, or time, for example. Whole Crop Biofuel production can include various systems and methods for evaluating and balancing these various considerations in generalized or highly specific ways.

Residues can be removed concurrently with the harvest of primary biofuel feedstock (e.g., corn kernels, soybeans, sugar canes, canola seed, etc.) or in one or more independent processes. For example, combines or harvesters used for harvesting conventional agricultural commodities could be modified to enable simultaneous collection of agricultural residues that would otherwise be left behind or deposited in the field.

Alternatively, agricultural residues could be collected with balers or arranged into windrows, processed by balers, and subsequently collected after the primary agricultural commodities are removed. Other suitable machinery and processes can also be used to enable collection and materials handling of agricultural residues. This can be accomplished all at once or in several stages to optimize costs and/or residue characteristics, including for example moisture content, dry matter yield, mineral content, etc., and/or soil characteristics including for example nutrient retention, carbon content, soil structure, erosion resistance, etc. Many variants of whole crop biomass removal are feasible.

In various embodiments, a differentiating feature of agricultural production for Whole Crop Biofuel Production is the deliberate removal and/or utilization of biomass other than that associated with the primary biofuel feedstock to support production of biofuel co-products—even if some or all of those co-products are returned to the field (e.g., in the form of bio-char as a soil amendment)—in order to reduce biofuel carbon intensity and/or improve performance against sustainability metrics.

Biofuel production can include processes by which the portion of agricultural products to be thermochemically, biochemically, or otherwise converted into biofuels—the primary biofuel feedstock—is so converted. Many variants of these processes exist, have been proposed, or can be developed. Any and all biomass to biofuel conversion technologies can be utilized within Whole Crop Biofuel Production systems. Conventional or novel biofuel conversion processes can be integrated within Whole Crop Biofuel Production systems without modification.

For example, biofuel production via fermentation (e.g., ethanol from corn, cane, wheat, beets, or cellulosic feedstock) can include among other things: all preparation and pre-treatment of the biomass to enable biochemical agents access the sugar, starch or cellulose; conversion of such biomass fractions to fermentable sugars; fermentation; biofuel purification; and all subsequent, ancillary, and downstream processes required to produce and deliver useful biofuel products. Biofuel production can include production of co-products from the biomass inputs to biofuel production (as opposed to those from agricultural residues, which are discussed below). For example, in the case of ethanol from corn kernels co-products might include wet or dry distillers' grain for use as animal feed, extractable corn oil for use as a food product, industrial chemical, for conversion into biofuel or related products, or for other uses.

As another example, in the case of lipid rich feedstock biofuel production can include among other things: lipid or vegetable oil extraction; vegetable oil conversion to biofuels via trans-esterification or various treatments with hydrogen, for example; and all subsequent, ancillary, and downstream processes required to produce and deliver useful biofuel products. In this context, biofuel production co-products include but are not limited to residues from oil extraction, which is variously referred to as oil cake or meal (as in soy meal).

These and other examples are shown in Table 1. This table is provided to indicate the breadth of biofuel production systems capable of being integrated into Whole Crop Biofuel Production. It is not intended to be exhaustive as feedstock types, conversion process, and potential products are constantly evolving and being developed.

In various embodiments, a distinguishing feature of biofuel production in Whole Crop Biofuel Production is that a portion of the biomass produced along with the primary biofuel feedstock is used to provide co-products to the primary biofuel that effectively reduce the biofuel's carbon intensity and/or improve its performance on sustainability metrics.

TABLE 1

Examples of biofuel conversion processes that can be used in connection with Whole Crop Biofuels Production

| Feedstock | Primary conversion processes | Potential products/co-products |
| --- | --- | --- |
| Lipid-rich biomass, including soybean, canola, rapeseed, camolina, palm, *jatropha*, mahua, mustard, flax, sunflower, palm oil, hemp, field pennycress, *pongamia pinnata* and algae | Vegetable extraction followed by Trans-esterification | Fatty Acid Methyl Esters or "bio-diesel"; oil cake, meal, and related animal feed products; glycerin and related products |
| | Vegetable oil extraction followed by various potential processes involving hydrogen, similar to refinery hydro-treatment or hydrogenation | Substitutes for diesel, kerosene, and related liquid fuels; non-condensable hydrocarbons; oil cake, meal, and related animal feed products |
| Starch or sugar rich biomass, including corn kernels, wheat, sugarcane, and sugar beet | Fermentation and related biochemical conversion processes, potentially followed by subsequent fuel upgrading processes | Bio-alcohols and fuels produced from bio-alcohols; food grade oils; oil-derived fuels and chemicals; animal feed in the form of grain meal and/or distillers grains; cellulose-derived polymers and chemicals; and CO2 |
| Cellulosic feedstock including switchgrass, miscanthus, other herbaceous energy crops, woody biomass, poplar, willow, wood wastes, timber residues, mill wastes, and agricultural residues. In many thermochemical biofuel conversion processes these biomass feedstock can be mixed or co-utilized with coal. In many of these processes, primary products or co-products can | Fermentation and related biochemical conversion processes | Bio-alcohols and fuels produced from them; lignin and products produced from lignin; heat, power, and or electricity |
| | Pryrolysis | Pyrolysis oils; fuels and chemicals produced from pyrolysis oils; gaseous hydrocarbons; fuels and chemicals produced from primary gaseous hydrocarbon |

TABLE 1-continued

Examples of biofuel conversion processes that can be used
in connection with Whole Crop Biofuels Production

| Feedstock | Primary conversion processes | Potential products/co-products |
|---|---|---|
| be used as an input to other processes to yield even more diverse final products. | | products; bio-char; fuels, chemicals, and products produced from bio-char; heat, power, and or electricity |
| | Gasification and liquid fuel synthesis | Gaseous fuels including synthetic natural gas or hydrogen; liquid fuels including alcohols, Fisher-Tropsche liquids, synthetic gasoline, naphtha, chemicals and products from these various intermediate products; heat, power, and or electricity; bio-char |
| | Hydrothermal upgrading | So called bio-crude oils; liquid and gaseous fuels and chemicals produced from bio-crude and related products; heat, power, and or electricity; carbonized bio-solids |
| | Liquefaction | So called bio-crude oils; liquid and gaseous fuels and chemicals produced from bio-crude oils; ammonia; CO2; and heat, power, and or electricity |
| | Anaerobic bio-digestion | Methane; liquid and gaseous fuels and chemicals produced from methane; CO2; heat, power, and or electricity |

Agricultural residue utilization can include processes, systems, and methods that use as process inputs agricultural residues resulting as a consequence of primary biofuel feedstock production. The use of these agricultural residues improves the lifecycle environmental performance of associated biofuel production systems. This improved environmental performance can be credited to the biofuels and thereby reduce the carbon intensity of the biofuel, improve its performance on sustainability metrics, enable generation of additional tradable credits, and/or qualify the biofuel with respect to other environmental standards, including sustainability standards.

In various embodiment, a differentiating feature of agricultural residue utilization in the context of Whole Crop Biofuels is that the linkage for emissions accounting or other purposes between this biomass (e.g., the agricultural residues) and its products on the one hand and the primary biofuel on the other is via the production of the primary feedstock for biofuel production (rather than via primary biofuel feedstock pre-treatment and processing into biofuel products). While, biofuel production systems can conceivably incorporate agricultural residues utilization within the biofuel production process, such utilization does not exclude this biomass from the definition of agricultural residue.

Utilization of agricultural residues for biofuel production does not necessarily imply Whole Crop Biofuel Production. Rather Whole Crop Biofuel Production can be differentiated from other production processes by the utilization of one portion of a biomass feedstock for biofuel production and another portion of the biomass feedstock for some another purpose that enables the use, application, or assignment of reduced biofuel carbon intensities or improved biofuel performance against sustainability metrics (e.g., mitigates anthropogenic greenhouse gas emissions and associates the mitigation to a biofuel in a context of a regulatory framework).

Note that several potential uses for agricultural residues within Whole Crop Biofuel Production can also yield secondary biofuels, but by a different process from the primary biofuel. For example a production system including ethanol production from corn kernels and ethanol production from corn stover represents a Whole Crop Biofuel Production system because the two portions of the corn crop (e.g., kernels and stover) are processed by distinct technologies (e.g., conventional starch-to-ethanol and emerging cellulosic ethanol technologies, respectively) to yield a primary biofuel (e.g., ethanol from corn kernels) with a reduced carbon intensity relative to ethanol produced without use of the agricultural residues resulting from production of the primary biofuel feedstock (corn kernels).

In the case of first generation biofuels, agricultural residues can include but are not limited to stalks, stems, leaves, cobs, straw, pods, shells or other biomass that is not processed further in biofuels production. This residue might traditionally be used or disposed of in a variety of ways including but not limited to being: burned in the field or in piles or other aggregations; left in the field to rot or support soil structure, fertility, or erosion control; or used as fodder or bedding in animal husbandry. In Whole Crop Biofuels Production, some fraction of these residues can be used to supply one or more additional products or services including, for example: building or construction materials; pulp or paper products; energy products (e.g., heat, power, electricity, liquid fuels, gaseous fuels, solid fuels, etc.) produced using one or more different technologies (e.g., combustion, gasification, liquefaction, liquid fuels synthesis, fermentation, anaerobic digestion, pyrolysis, torrefaction, hydrothermal treatment, hydrothermal upgrading, etc.); gaseous, liquid, and/or solid fuels or chemicals; secondary products produced from the gaseous, liquid, or solid fuel or chemical products (e.g., paints, dyes, polymers, adhesives, lubricants, organic acids, etc.); bio-char, bio-coal or other bio-solids; soil amendments and fertilizers; animal feeds; CO2 for enhanced oil recovery or sequestration away from the atmosphere; and/or biomass carbon for sequestration by other means (including solid phase biomass carbon sequestration). Due to their origin in biomass from within the biofuel supply chain, these products can be viewed as co-products of the primary biofuel for the purposes of lifecycle assessment of carbon intensity and sustainability performance.

As noted above, some proportion of agricultural residues might be effectively utilized in the agricultural production system by being retained on the field in its raw form or by being returned to the field in a modified form (e.g., as bio-char or another bio-solid resulting from various processes). This proportion of agricultural residues can, but does not necessarily, result in LCA emissions accounting credits in carbon intensity measures, depending on the carbon intensity evaluation methodology. As the proportion retained in the field in its raw form can be highly variable across time, location, crop, management practice and/or other dimensions, this use can on some occasions and in some circumstances be applied to 100% of agricultural residues. This does not preclude associated biofuels from being defined as Whole Crop Biofuels, so long as on at least some occasions and/or in some circumstances the proportion of residues left in the field in its raw form is less than 100%. Note that the term "field" is used to refer to the production environment, whether or not it is manifest as a field in the conventional agricultural sense of the word.

An important feature of these co-products (either those returned to the field as a soil amendment for example, those exported, or both) within Whole Crop Biofuel Production systems is that their use—individually or in some combination—provides emissions or sustainability benefit(s) that can be attributed to the biofuel within one or more measures of carbon intensity or sustainability performance.

Several examples of agricultural residue utilization systems suitable for integration with alternate primary biofuel feedstock to enable Whole Crop Biofuel Production are indicated in Table 2. Note that this table is not intended to be exhaustive as the primary biofuel feedstock, agricultural residue definition, and particularly residue utilization technologies and products mixes are constantly evolving. The absence of particular feedstock, residues, or utilization technologies from this table does not imply that they are excluded from the applicability or definition of Whole Crop Biofuel Production.

TABLE 2

Examples of agricultural residue utilization for alternate primary biofuel feedstock.

| Biofuel feedstock | Agricultural residue | Utilization technology | Potential residue-derived. biofuel co-products |
|---|---|---|---|
| Agricultural products including corn kernels, wheat, sugarcane, and sugar beet, soybean, canola, rapeseed, camolina, mustard, flax, sunflower, palm oil, hemp, field pennycress | Stalks, stems, leaves, cobs, "corn stover", "cane trash", husks, shells, pods and other biomass not specifically rich in starches, sugars, or lipids and typically separated from the biofuel feedstock before conversion to biofuels | Combustion; gasification; integrated gasification combined cycle power generation; cellulosic biofuel production technologies (see Table 1); carbonization; torrefaction; hydrothermal treatment; enzymatic hydrolysis; anaerobic digestion; composting; solid phase biomass carbon storage | building or construction materials; pulp or paper products; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds, CO2 for enhanced oil recovery or sequestration; biomass carbon for sequestration by other means (including solid phase biomass carbon sequestration) |
| Oil seeds from trees or woody shrubs | Leaves, trimmings, shells, pods, husks and other available biomass not specifically rich in lipids, not suitable for transport to conversion facilities or biofuel conversion to lipid-derived biofuels, or otherwise diverted from biofuels production | | |
| Cellulosic biomass | Leaves, branches, and other biomass that is deemed unsuitable for biofuel production, unsuitable for transport to biofuel production facilities, or is otherwise diverted from biofuel production | | |
| Aquaculture biomass | Algae residues not suitable for conversion to biofuels | | |

Emissions accounting and/or sustainability assessment systems can include any one or more systems that enable emissions and sustainability benefits of using the whole crop biomass to be attributed to the biofuel product to enhance the value of that biofuel and or to generate tradable credits that can be marketed along with or independently from the biofuel product. These systems can take any number of forms, depending critically on regulatory and or market requirements and opportunities. Many such systems exist, are being developed, or have been conceived, including for example the California modified GREET model, GHGenius, EPA's consequential LCA modeling framework developed in the context of the federal Renewable Fuel Standard (RFS2), the Gabi Software tool, the SimaPro software tool, the EcoInvent Database, among others.

The emissions accounting and/or sustainability assessments or assessment systems for Whole Crop Biofuel Production can be differentiated from those used to describe or evaluate other production systems by the LCA accounting credits assigned or other accounting provided for the mixes of products and co-products unique to Whole Crop Biofuel Production. These mixes are further elaborated in text above, in Tables 1-3, in FIG. 2C (using the example of ethanol production from corn), and in Exhibit A.

Because Whole Crop Biofuel Production can be implemented in many ways by one or more parties in one or more countries or jurisdictions, the emissions accounting and/or sustainability assessment system represents a key mechanism for identifying and differentiating Whole Crop Biofuel Production from other production systems and Whole Crop Biofuels from other biofuels. This is because it provides an integrated record of the products, co-products, and associated production system used for any given biofuel product. In particular, the emissions accounting and/or sustainability assessment of Whole Crop Biofuels can include some type of credit for the product mixes resulting from use of the whole crop biomass, including agricultural residues. Therefore, any biofuel produced and documented with an emissions accounting and/or sustainability assessment system that reflects a product and co-product mix consistent with Whole Crop Biofuel Production can be identified and defined as a Whole Crop Biofuel.

Several examples of components that might be included in emissions accounting and/or sustainability assessments of Whole Crop Biofuel Production systems are indicated in Table 3. This table is not intended to be exhaustive as the set of primary biofuel products, co-products from primary biofuel processing, and potential co-products from agricultural residue processing are constantly evolving. The absence of any particular primary product, processing co-product, residue-derived co-product, or combination thereof does not imply that such product, co-product, or combination is not an example of Whole Crop Biofuel Production.

TABLE 3

Example product mixes and components reportable within emissions accounting and/or sustainability assessments of Whole Crop Biofuels and Whole Crop Biofuel Production systems.

| Primary biofuel product | Co-products from primary biofuel processing | Co-products from agricultural residue processing |
| --- | --- | --- |
| Corn (including maize) alcohols (including ethanol, butanol, etc.), or fuels derived by upgrading corn-derived alcohols. | Any combination of animal feed (e.g., distillers grains), products for human consumption (e.g., edible oils), biofuels or chemicals derived from extracted oils (e.g., bio-diesel, or petroleum substitutes produced via hydro-treatment), and other co-products from corn kernel fractions not directly converted to biofuel. | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; $CO_2$ for enhanced oil recovery or sequestration; biomass carbon for sequestration by other means (including solid phase biomass carbon sequestration) |
| Sugar cane alcohols (including ethanol, butanol, etc.), or fuels derived by upgrading cane alcohols. | Any combination of products for animal or human consumption (e.g., sugar, molasses, etc.), bagasse-derived heat and power (including electricity), bagasse-derived solid phase biomass carbon storage, other co-products derived from cane fractions not directly converted to biofuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; $CO_2$ for enhanced oil recovery or sequestration; biomass carbon for sequestration by other means (including solid phase biomass carbon sequestration) |

TABLE 3-continued

Example product mixes and components reportable within emissions accounting and/or sustainability assessments of Whole Crop Biofuels and Whole Crop Biofuel Production systems.

| Primary biofuel product | Co-products from primary biofuel processing | Co-products from agricultural residue processing |
|---|---|---|
| Wheat alcohols (including ethanol, butanol, etc.), or fuels derived by upgrading wheat alcohols. | Any combination of products for animal or human consumption, processing residue derived heat and power (including electricity), other co-products derived from wheat fractions not directly converted to biofuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; CO2 for enhanced oil recovery or sequestration; biomass carbon for sequestration by other means (including solid phase biomass carbon sequestration) |
| Sugar beet alcohols (including ethanol, butanol, etc.), or fuels derived by upgrading beet alcohols. | Any combination of products for animal or human consumption, processing residue derived heat and power (including electricity), other co-products derived from sugar beet fractions not directly converted to biofuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; CO2 for enhanced oil recovery or sequestration; biomass carbon for sequestration by other means (including solid phase biomass carbon sequestration) |
| Soy biodiesel and other petroleum substitutes derived from soy oils. | Any combination of products for animal or human consumption (including edible oils, soy meal, oil cake, etc.), other co-products derived from soy beans not directly converted to biofuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; CO2 for enhanced oil recovery or sequestration; biomass carbon for sequestration by other means (including solid phase biomass carbon sequestration) |
| biodiesel and other petroleum substitutes derived from canola, camolina, rapeseed, mustard, flax, sunflower, safflower, hemp, palm, *jatropha*, field pennycress, mahua, *pangamia pinnata*, or other oilseed crops | Any combination of products for animal or human consumption (including edible oils, soy meal, oil cake, etc.), other co-products derived from oilseed not directly converted to biofuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; CO2 for enhanced oil recovery or sequestration; biomass carbon for sequestration by other means (including solid phase biomass carbon sequestration) |
| Cellulosic biofuel | Any combination of the following produced as a co-product of the biomass processed in the facility or by the process producing the primary biofuel product: Heat, power, and or electricity; gaseous, liquid, or solid fuels or chemicals; products produced from gaseous, liquid, or solid fuel | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil |

TABLE 3-continued

Example product mixes and components reportable within emissions accounting and/or sustainability assessments of Whole Crop Biofuels and Whole Crop Biofuel Production systems.

| Primary biofuel product | Co-products from primary biofuel processing | Co-products from agricultural residue processing |
|---|---|---|
| | or chemical products; bio-char, bio-coal or related bio-solids; soil amendments and fertilizers; animal feeds, CO2 for enhanced oil recovery or sequestration; biomass carbon for sequestration by other means (including solid phase biomass carbon sequestration) | amendments and fertilizers; animal feeds; CO2 for enhanced oil recovery or sequestration; biomass carbon for sequestration by other means (including solid phase biomass carbon sequestration) |
| Algal biofuel | | building or construction material; pulp or paper substitute; heat, power, and or electricity; gaseous, liquid, or solid fuels or chemicals; secondary products produced from the gaseous, liquid, or solid fuel or chemical products; bio-char, bio-coal or related bio-solids; soil amendments and fertilizers; animal feeds; CO2 for enhanced oil recovery or sequestration; biomass carbon for sequestration by other means (including solid phase biomass carbon sequestration) |

Additional examples of key system components in sample Whole Crop Biofuel Production Systems are provided in Exhibit A.

EXAMPLES

Figure 3A:
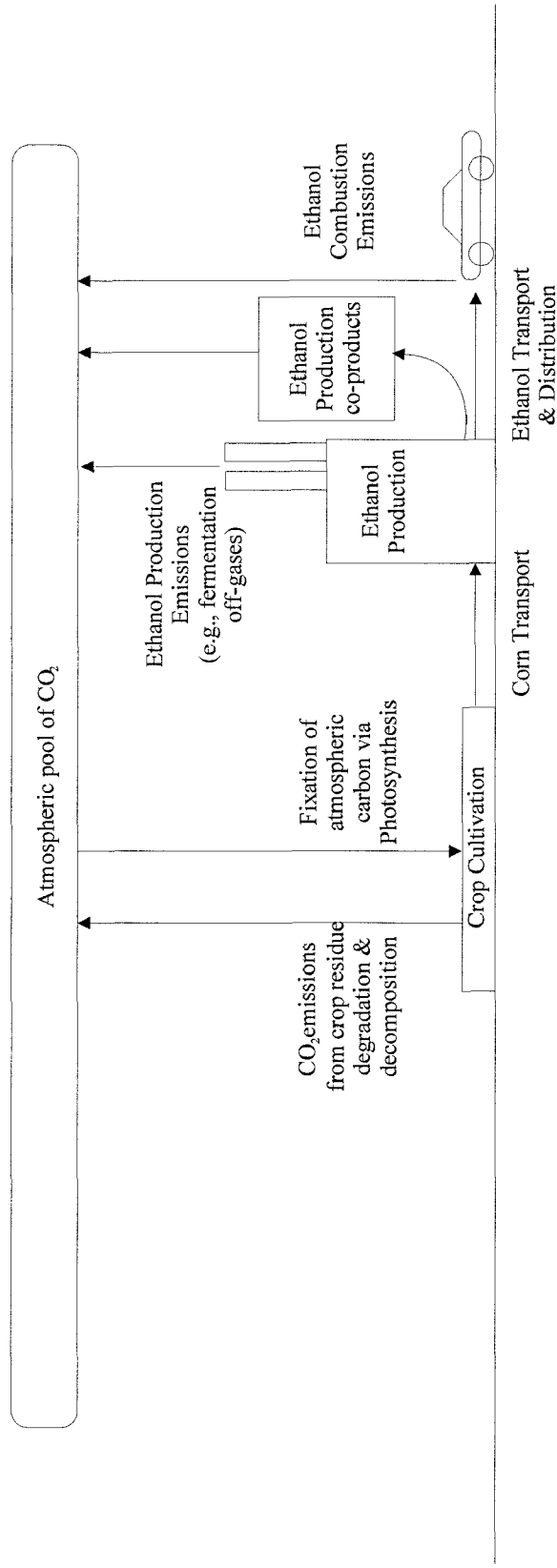
FIG. 3A-D shows biogenic carbon flows in different examples of the production and use of corn ethanol.

Methods of Engineering a Biofuel Cycle and Accounting for Carbon Flows And Determining a Regulatory Value for a Biofuel FIG. 3A shows biogenic carbon flows in an example of conventional corn ethanol production and use. FIG. 3A is useful comparison for FIGS. 3B-3D, which illustrate examples of engineering a carbon cycle in the context of WCBP to mitigate anthropogenic greenhouse gas emissions. FIGS. 3A-D also illustrates examples of carbon cycle components that can be used in determining a regulatory value that accounts for the carbon intensity and/or sustainability of a biofuel. The following examples can be mapped onto the process schematics shown in FIG. 4 and algorithms discussed in connection with Tables 4-8, and analyzed to determine a regulatory value for a biofuel. These examples, together with the disclosure, also provide a framework and useful examples for applying the invention in the context of additional and/or future regulatory frameworks.

The carbon cycle shown in FIG. 3A can be considered to begin when biogenic carbon is fixed from the atmosphere via photosynthesis. The portion of the fixed carbon embodied in primary biofuel feedstock (e.g., corn kernels) is transported to an ethanol production facility. Separately, the portion of the fixed carbon embodied in agricultural residues is subject to natural degradation and decomposition, through which it is returned to the atmosphere. Ethanol is produced at the production facility from the primary biofuel feedstock. A portion of primary biofuel feedstock carbon is released to the atmosphere during ethanol production (e.g., via fermentation offgases), while the balance is converted into biofuel (e.g., ethanol) and biofuel production co-products (e.g., animal feed, vegetable oils, and/or biodiesel). Then, the ethanol and ethanol production co-product(s) are used, and the biogenic carbon in the biofuel and biofuel production co-products is returned to the atmosphere. In some cases this return of biogenic carbon to the atmosphere can be direct (e.g., in the case of biofuel combustion) or indirect (e.g., in the case of animal feed co-product use).

Note that the figures focus on biogenic carbon flows in order to illustrate a principle of WCBP. However, other flows of greenhouse gases are relevant to the biofuel carbon cycle and accounting for carbon flows and determining a regulatory value for a biofuel. For example, while regulatory values can be calculated solely from biogenic carbon flows, in many cases a consideration of carbon flows from fossil hydrocarbon sources (e.g., petroleum, coal, and the like) can be important in calculating a regulatory value. Examples of other relevant flows are discussed in connection with Tables 4-9.

Example 1

Combustion

Figure 3B:
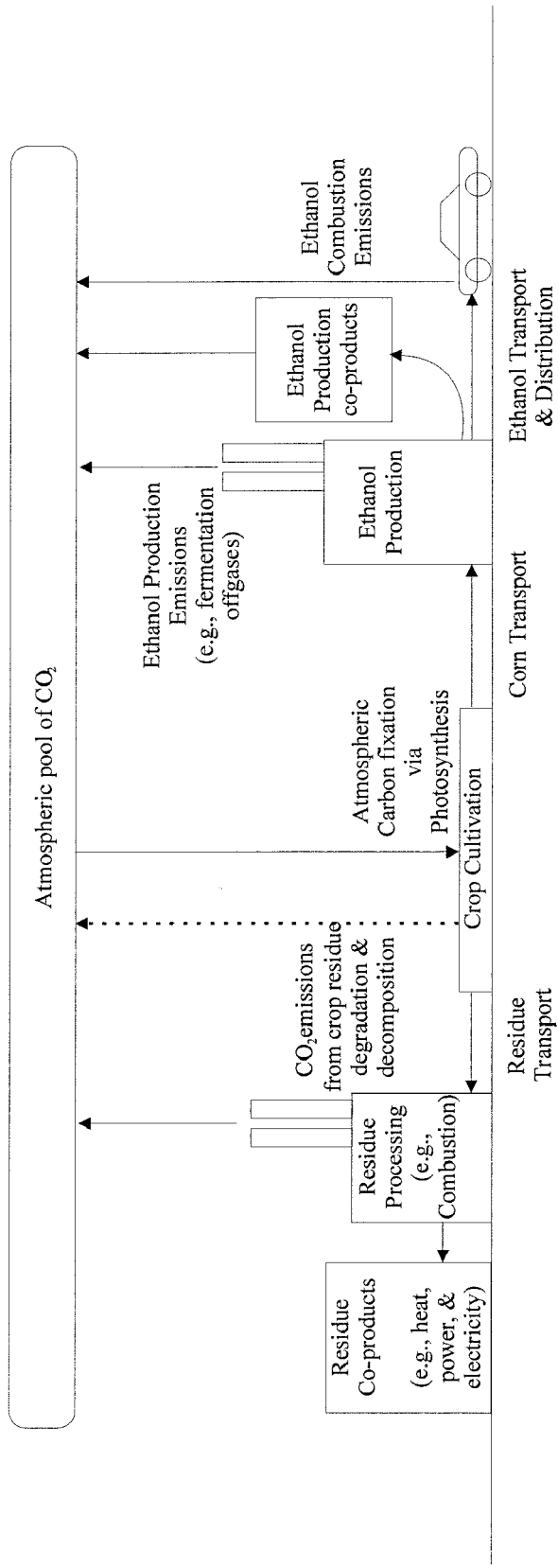

FIG. 3B shows biogenic carbon flows in an example of WCBP of corn ethanol, where the carbon cycle is engineered to include residue processing by combustion. Combustion of an agricultural residue can substitute for combustion of a fossil hydrocarbon product, thereby preventing carbon from a fossil hydrocarbon product from flowing to the atmosphere. For example, the production and use of the co-product can include producing electricity from a combination of agricultural residue and coal, thereby reducing coal use and reducing the amount of carbon from coal that is released into the atmosphere.

In FIG. 3B, the fixing of biogenic carbon from the atmosphere, as well as the production and use of ethanol can be essentially the same as shown and described in connection with FIG. 3A. A second fraction of the agricultural biomass (e.g., comprising agricultural residue), which embodies biogenic carbon, is transported for processing into co-product (e.g., heat, power, electricity, and the like). The co-product generates LCA emission accounting credits. In this example, processing releases the biogenic carbon to the atmosphere. However, because the carbon in the biofuel is biogenic, the net greenhouse gas emission is zero. Nevertheless, anthropogenic greenhouse gas emissions are mitigated by WCBP because the use of a fossil hydrocarbon product (e.g., coal) is replaced by use of the second fraction of the agricultural biomass (e.g., agricultural residue burned in a coal-fired electric plant). Other examples of WCBP may not involve the same degree of contemporaneous release of biogenic carbon to the atmosphere (e.g., where the co-product is not contemporaneously combusted or decomposed, e.g., where a co-product is bio-char, bio-chemical, bio-plastic, building material, construction material, paper pulp, and the like).

Optionally (e.g., shown as a dashed line from crop cultivation to the atmospheric pool of CO2) biomass, for example some of the agricultural residue, can be left in the field to support soil fertility, protect against erosion, and/or achieve other agricultural objectives. Such biomass is subject to natural degradation and decomposition, through which the embodied biogenic carbon is returned to the atmosphere. This flow is indicated with a dashed line to reflect its secondary impact in differentiating net carbon flows relative to those indicated in FIG. 3A. Note that in this example, the arrow connecting Residue Processing to Co-products of Residue Processing represents an energy flow, not a carbon flow. Also note that Residue Processing (as well as any of the other function represented by arrows or boxes in any of the embodiments or examples) can be implemented in multiple steps.

Example 2

Cellulosic Biofuel

Figure 3C:
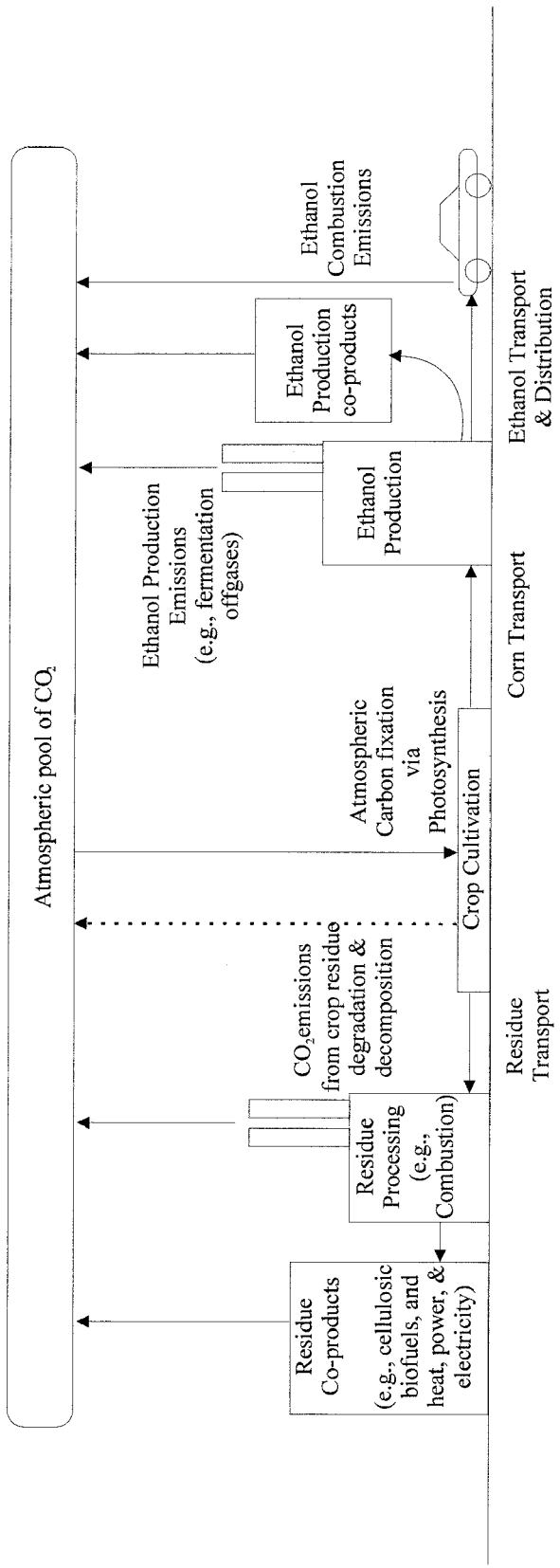

FIG. 3C shows biogenic carbon flows in an example of WCBP of corn ethanol, where the carbon cycle is engineered to include the production of a cellulosic biofuel as a co-product. Combustion of such a biofuel co-product can substitute for combustion of a fossil hydrocarbon product, thereby preventing carbon from a fossil hydrocarbon product from flowing to the atmosphere.

In FIG. 3C, the fixing of biogenic carbon from the atmosphere, as well as the production and use of ethanol can be essentially the same as shown and described in connection with FIG. 3A. A second fraction of the agricultural biomass (e.g., comprising agricultural residue), which embodies biogenic carbon, is transported for processing into co-product (e.g., cellulosic biofuel, heat, power, electricity, and the like). The co-product generates emission accounting credits and mitigates anthropogenic greenhouse gas emission. In this example, processing and use releases the biogenic carbon to the atmosphere, for example, through the combustion of the cellulosic biofuel and the production of any heat, power, and/or electricity. As described in connection with FIG. 3B, biomass can optionally be left in the field to support soil fertility, protect against erosion, and/or achieve other agricultural objectives.

Example 3

Pyrolysis

Figure 3D:
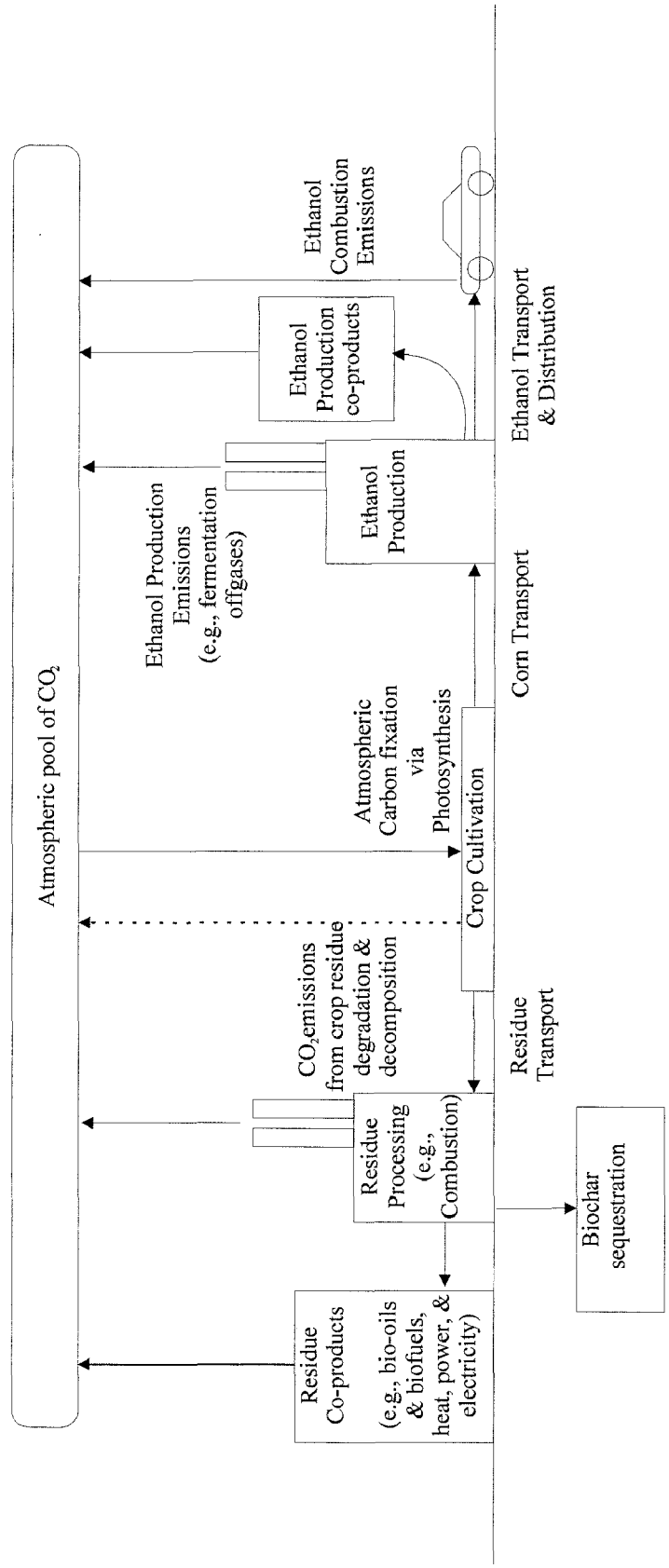

FIG. 3D shows biogenic carbon flows in an example of WCBP of corn ethanol, where the carbon cycle is engineered to include co-product production by pyrolysis. Combustion of a pyrolysis co-product (e.g., bio-oil or a bio-oil product) can substitute for combustion of a fossil hydrocarbon product, thereby preventing carbon from a fossil hydrocarbon product from flowing to the atmosphere. Sequestration of a pyrolysis co-product (e.g., biochar) can also prevent net carbon flow to the atmosphere on an environmentally relevant timescale.

In FIG. 3D, the fixing of biogenic carbon from the atmosphere, as well as the production and use of ethanol can be essentially the same as shown and described in connection with FIG. 3A. A second fraction of the agricultural biomass (e.g., comprising agricultural residue), which embodies biogenic carbon, is transported for processing via pyrolysis into co-product(s) (e.g., biochar, bio-oils, solid biofuels, liquid biofuels, gaseous biofuels, heat, power, electricity, and the like). The pyrolysis co-product(s) generates emission accounting credits and mitigate the release of carbon into the atmosphere. In this example, processing and use releases the biogenic carbon to the atmosphere, for example, through the combustion of co-product(s) and the production of any heat, power, and/or electricity. However, biogenic carbon is not necessarily released contemporaneously into the atmosphere. For example, biochar can be sequestered away from the atmosphere for time scales relevant to climate policy objectives. In some embodiments, biochar can be used as a solid fuel. As described in connection with FIG. 3B, biomass can optionally be left in the field to support soil fertility, protect against erosion, or achieve other agricultural objectives.

Example 4

Process Schematics for Lifecycle Emissions Accounting

The components of a WCBP carbon cycle can be represented as process schematics. Such schematics can facilitate the conceptualization and/or mapping of a biofuel carbon cycle (e.g., including a fuel pathway) to an accounting system. In this example FIG. 4A shows a process schematic for lifecycle emissions accounting (e.g., related to FIG. 3A and Table 4) and FIG. 4B shows a process schematic for lifecycle emissions accounting for WCBP corn ethanol, where a co-product is electricity (e.g., related to FIG. 3B and Tables 5-8).

Figure 4A:
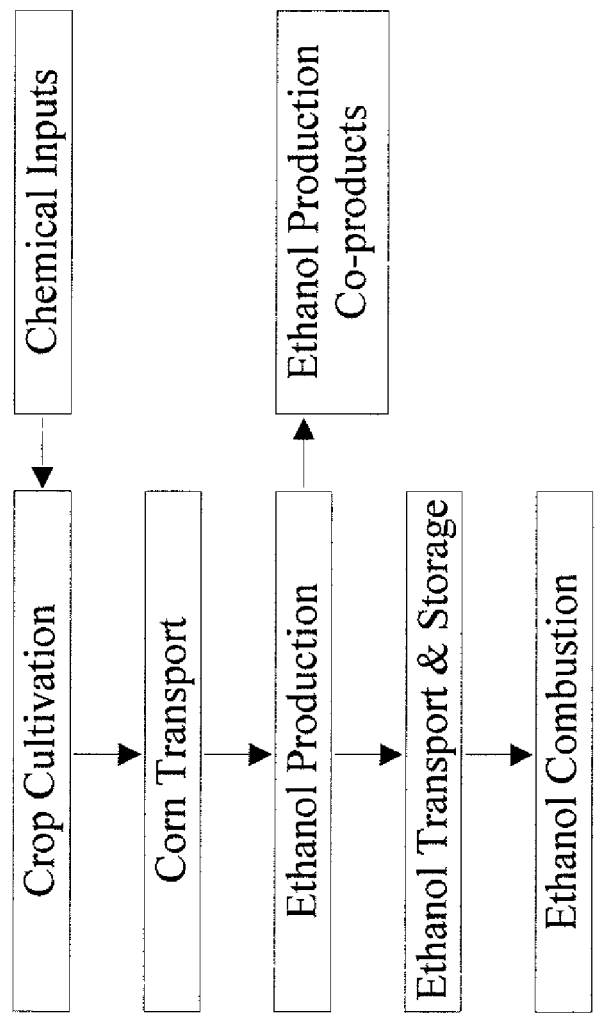
FIGS. 4A and 4B shows example process schematics for lifecycle emissions accounting.

The schematic in FIG. 4A is adapted from FIG. 1 of the California Air Resources Board "Detailed California-Modified GREET Pathway for Corn Ethanol," which describes the lifecycle components used to define the lifecycle greenhouse gas emissions from corn ethanol production and to define the regulatory default value of carbon intensity to be applied to corn ethanol fuels under the California Low Carbon Fuel Standard. Such regulatory default values provide a baseline for a particular biofuel (e.g., ethanol with a carbon intensity=x). Entities would then have an environmental and economic incentive to engineer and/or characterize a biofuel carbon cycle that results in a biofuel with a more favorable regulatory value (e.g., ethanol with a carbon intensity<x, though the relationship may vary depending upon the metric of sustainability/CI and accounting convention).

Figure 4B:
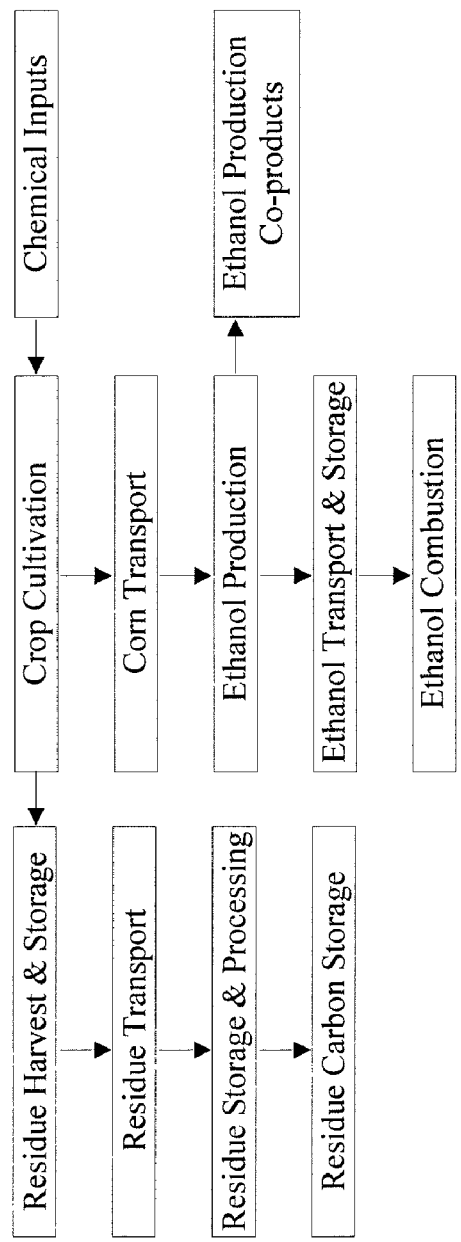

FIG. 4B shows an example process schematic for lifecycle emissions accounting for WCBP corn ethanol, where a co-product is electricity. This schematic illustrates lifecycle components used to describe the lifecycle greenhouse gas emissions from WCBP corn ethanol. One difference between this schematic and FIG. 4A is the column of lifecycle components on the left side of the figure, which describe processes associated with harvest, transport, and utilization of crop residues for the production of electricity. Note that FIGS. 4A and 4B provide one convenient format for illustrating these lifecycle components, which can be alternatively illustrated with greater or fewer lifecycle components. Other formats are conceivable and would likely be required in other regulatory contexts. A person with ordinary skill in the art could adapt the present examples to other formats for illustrating, conceptualizing, and quantifying the lifecycle components and emissions from SPBCS. Such adaptations are included in SPBCS.

One feature of various embodiments of WCBP is the inclusion of components describing the utilization of agricultural residues that are produced as a consequence of biofuel feedstock cultivation (crop cultivation in the present example), for purposes that generate emissions accounting credits within the biofuel lifecycle greenhouse gas emissions accounting schematic. No incentives existed for SPBCS, or the concept of developing new sources of emission accounting credits, before the emergence of regulatory frameworks such as the SU-ETS and no incentives existed for developing new sources of emissions accounting credits within fuel supply chains before fuel-specific regulatory frameworks including: U.S. RFS2; LCFS currently implemented in CA and BC, and being contemplated for WA, OR, and NEMA regions; EU-RED and FQD; and UK-RTFO.

Given a biofuel or biofuel carbon cycle, there are a number of ways to account for carbon flows and determine a regulatory value for the biofuel. In jurisdictions having an established regulatory system, a person of ordinary skill in the art would understand that they could first look to the established regulatory system for guidance in determining an applicable methodology. However, it is also understood that such systems are generally based upon quantifying relevant components of the biofuel carbon cycle and accounting for the relevant components to arrive at a net carbon intensity and/or sustainability measure for the biofuel.

The quantification of relevant carbon cycle components can be in terms of units of greenhouse gas per units of energy (e.g., gCO2/MJ). The accounting methodology can be, for example, system expansion or allocation. In system expansion, emissions accounting credits are provided for net emissions reductions associated with use of the various products as a substitute for more conventional products (see, e.g., Examples 6 and 7). Under allocation methodologies, a fraction of lifecycle emissions (generally emissions associated with processes upstream of the material diversion for co-product use) are allocated to the various products (see, e.g., Examples 8 and 9).

Example 5

Greenhouse Gas Emissions Summary for Corn Ethanol (Baseline)

Table 4 shows a greenhouse gas emission (GHG) accounting summary for dry and wet mill corn ethanol. This summary serves as a baseline for the WCBP examples shown in Table 5-8. This summary is adapted from the California Air Resources Board 2009 "Detailed California-Modified GREET Pathway for Corn Ethanol," where the derivation of the values is provided in detail.

TABLE 4

| Corn Ethanol Fuel Cycle Components | Dry Mill Process GHG (gCO2/MJ) | Wet Mill Process GHG (gCO2/MJ) |
| --- | --- | --- |
| Well-to-tank | | |
| Crop Cultivation | 5.65 | 5.81 |
| Chemical Inputs to Cultivation | 30.2 | 31.35 |
| Corn Transportation | 2.22 | 2.28 |
| Ethanol Production | 38.3 | 48.78 |
| Ethanol Transport & Storage | 2.7 | 2.63 |
| Ethanol Production Co-products | −11.51 | −16.65 |
| Total well-to-tank | 67.6 | 74.2 |
| Tank-to-wheel | | |
| Ethanol Combustion | 0 | 0 |
| Total tank-to-wheel | 0 | 0 |
| Total well-to-wheel | 67.6 | 74.2 |

In this example, the regulatory value for dry mill corn ethanol is 67.6 gCO2/MJ and the regulatory value for wet mill corn ethanol is 74.2 gCO2/MJ. The accounting shown in Table 4 (as well as Table 5-8) reflects direct emissions only. Additional emissions factors for indirect emissions (e.g., indirect land use change) can also be included within an accounting framework, as can other combinations of direct emissions. For example, additional emissions factors or other accounting may also be included to represent increased fertilizer requirements to compensate for nutrients removed with agricultural residues. In examples 5-9, the Ethanol Combustion values assume all carbon in the fuel itself is biogenic and therefore do not represent a net emission to the atmosphere.

Example 6

GHG Summary for Corn Ethanol (WCBP, Electricity Co-Product, System Expansion Methodology)

Table 5 shows a greenhouse gas emissions summary for dry and wet mill corn ethanol for a WCBP process where electricity is a co-product under a system expansion methodology.

TABLE 5

| Corn Ethanol Fuel Cycle Components | Dry Mill Process GHG (gCO2/MJ) | Wet Mill Process GHG (gCO2/MJ) |
| --- | --- | --- |
| Well-to-tank | | |
| Crop Cultivation | 5.65 | 5.81 |
| Chemical Inputs to Cultivation | 30.2 | 31.35 |
| Corn Transportation | 2.22 | 2.28 |
| Ethanol Production | 38.3 | 48.78 |
| Ethanol Transport & Storage | 2.7 | 2.63 |
| Ethanol Production Co-products | −11.51 | −16.65 |
| Residue Harvest & Storage | 1.70 | 1.74 |
| Residue Transportation | 2.22 | 2.28 |
| Electricity production | 0 | 0 |
| Electricity utilization/substitution | −68.8 | −66.3 |
| Total well-to-tank | 2.7 | 12.0 |
| Tank-to-wheel | | |
| Carbon in fuel | 0 | 0 |
| Total tank-to-wheel | 0 | 0 |
| Total well-to-wheel | 2.7 | 12.0 |

In this example, the regulatory value for dry mill corn ethanol is 2.7 gCO2/MJ and the regulatory value for wet mill corn ethanol is 12.0 gCO2/MJ. In comparison to Example 5, the electricity co-product provides a significant benefit in terms of providing the corn ethanol with a more favorable regulatory value than the baseline. Thus, the environmental and accounting value of the co-product is large (e.g., dominates the calculation of the regulatory value) and the environmental and accounting cost of co-product production is small (e.g., less than that of biofuel production and little effect on the regulatory value).

In this Example, the Residue Harvest & Storage value assumes that residue harvest requires 30% of the energy required (yielding 30% of the GHG emissions) for crop cultivation (e.g., corn farming) and has zero storage losses. The Residue Transportation value assumes that transportation emissions are equal to those for transporting the corn, based on 1:1 mass ratio (see below). However, emissions could be substantially higher (e.g., due to substantially lower density of stover, which could be mitigated by processing the agricultural residue) as well as differences in transportation mode (e.g., vehicle type, distance, and the like) and/or distance (in the case that biofuel and residue processing facilities are not co-located). The Electricity production value assumes that all carbon emitted is biogenic and does not represent a net emission to the atmosphere. The Electricity utilization/substitution value assumes the substitution of residue-generated electricity for electricity generated from coal. The derivation of the Electricity utilization/substitution value is shown in Example 7. Such variables, as well as other modification or variations to a WCBP system, are readily accounted for by measuring or calculating the emissions/carbon intensity/sustainability of the system components.

Example 7

Computational Algorithm for Defining Emissions Accounting Credits Applied in the Context of the California Low Carbon Fuel Standard (WCBP, Electricity Co-Product, System Expansion Methodology)

Table 6 shows an example of computational algorithm for defining emissions accounting credits produced by WCBP applied in the context of the California Low Carbon Fuel Standard (electricity co-product, system expansion methodology). The Carbon intensity of displaced electricity value reflects a direct substitution for electricity generation from coal (i.e., in this example, the residue is assumed to be co-fire in a coal fired power plant. Other values can be appropriate in other circumstances such as substitution for grid average electricity). The Electricity utilization/substitution values shown in Table 5 were calculated according to the following methodology.

TABLE 6

| Parameter | Dry Mill Process | Wet Mill Process | Units |
|---|---|---|---|
| Assumptions | | | |
| Stover:kernal mass ratio | 1 | 1 | kg(stover)/kg(kernel) |
| Fraction of stover removed | 0.5 | 0.5 | |
| Corn kernel mass (dry) | 21.5 | 21.5 | kg/bu |
| Corn ethanol yield | 2.62 | 2.72 | gal/bu |
| Ethanol heat content | 76330 | 76330 | btu/gal |

TABLE 6-continued

| Parameter | Dry Mill Process | Wet Mill Process | Units |
|---|---|---|---|
| Stover heat content | 15 | 15 | MJ/kg |
| Electricity conversion efficiency | 0.3 | 0.3 | MJ(electricity)/MJ(stover) |
| Carbon intensity of displaced electricity | 300 | 300 | gCO2/MJ (electricity displaced) |
| Energy unit conversion factor | 947.8 | 947.8 | btu/MJ |
| Algorithm output | | | |
| Carbon intensity reduction from WCBP | 68.8 | 66.3 | gCO2/MJ(eth) |

In this example, the reduction in regulatory value for dry mill corn ethanol is 68.8 gCO2/MJ and the reduction in regulatory value for wet mill corn ethanol is 66.3 gCO2/MJ. These values are used in Example 6.

In Example 7, the Assumptions are defined as follows: Stover:kernel mass ratio defines the ratio of corn stover yield to corn kernel yield on a dry mass basis; Fraction of stover removed defines the fraction of corn stover removed from the field, with the remainder assumed to be left in place to advance erosion protection, soil fertility, and other agricultural objectives; Corn kernel mass (dry) defines the mass of a bushel of corn kernels; Corn ethanol yield defines the ethanol produced per bushel of corn kernels; Ethanol heat content defines the heating value of anhydrous ethanol produced—a lower heating value is used here to be consistent with the standard applied under the California Low Carbon Fuel Standard; Stover heat content defines the heating value of stover removed from the field—this could be defined on either a higher heating value or lower heating value basis, so long as the corresponding electricity conversion efficiency is used; Electricity conversion efficiency defines the power plant-specific net energy efficiency of converting stover to electricity—this could be defined on either a higher heating value or lower heating value basis, so long as the corresponding stover heat content is used—in the case of stover co-fire with coal in a coal-fired power plant, this efficiency would likely be similar to the conversion efficiency of coal, potentially discounted for the relative moisture content of the stover (see Robinson, Keith, & Rhodes 2001); Carbon intensity of displaced electricity defines the emissions avoided by substituting electricity produced from corn stover for electricity that would otherwise be produced—in the case of stover co-fire with coal in a coal-fired power plant, this would likely be the emissions intensity of electricity produced from coal in that power plant; Energy unit conversion factor is used to convert between Imperial and metric units of measure for fuel heat content (btu or British thermal units and mega joules, respectively).

In Example 7, the algorithm output is the product of all of the factors listed under "Assumptions" above, except "Corn Ethanol Yield" and "Ethanol Heat Content", the inverses of which are multiplied by the product of the other factors in the algorithm. Example 7 shows one of many possible implementations of the algorithm. Other implementations could be applied within the context of the California Low Carbon Fuel Standard, and other implementations would almost certainly be required to utilize the invention in the context of fuel policies in other jurisdictions (e.g., BC LCFS, UK RTFO and EU RED and FQD). In these and other embodiments, loss factors could be applied or other means of accounting for carbon losses or other GHG emissions from residue carbon losses due to degradation during Residue Storage, transport, and the like. Differences in GHG emissions from biomass transport, due to a process implementation warranting alternate assumptions, for example, would need to be reflected.

Example 8

GHG Summary for Corn Ethanol (WCBP, Electricity Co-Product, Mass Allocation Methodology)

Table 7 shows a greenhouse gas emissions summary for dry and wet mill corn ethanol for a WCBP process where electricity is a co-product under a mass allocation methodology. In this mass allocation example, the Ethanol Production Co-products value is still based on system expansion, for consistency with the existing corn ethanol pathway defined by the California Air Resources Board.

TABLE 7

| Corn Ethanol Fuel Cycle Components | Dry Mill Process GHG (gCO2/MJ) | Wet Mill Process GHG (gCO2/MJ) |
|---|---|---|
| Well-to-tank | | |
| Crop Cultivation | 5.65 | 5.81 |
| Chemical Inputs to Cultivation | 30.2 | 31.35 |
| Corn Transportation | 2.22 | 2.28 |
| Ethanol Production | 38.3 | 48.78 |
| Ethanol Transport & Storage | 2.7 | 2.63 |
| Ethanol Production Co-products | −11.51 | −16.65 |
| Emissions allocated to residue co-product | −12.0 | −12.4 |
| Total well-to-tank | 55.6 | 61.8 |
| Tank-to-wheel | | |
| Carbon in fuel | 0 | 0 |
| Total tank-to-wheel | 0 | 0 |
| Total well-to-wheel | 55.6 | 61.8 |

In this example, the regulatory value for dry mill corn ethanol is 55.6 gCO2/MJ and the regulatory value for wet mill corn ethanol is 61.8 gCO2/MJ. The Emissions allocated to residue co-product (Emissions from crop cultivation and upstream processes are allocated to residue co-products (to be used for electricity production) pro-rata by mass, as described below in Example 9. Here, emissions from handling of residue co-products are considered as part of the residue co-product supply chain and are not accounted for in biofuel emissions accounting.

Example 9

Computational Algorithm for Defining Emissions Accounting Credits Applied in the Context of the California Low Carbon Fuel Standard (WCBP, Electricity Co-Product, Mass Allocation Methodology)

Table 8 shows an example of computational algorithm for defining emissions accounting credits produced by WCBP applied in the context of the California Low Carbon Fuel Standard (electricity co-product, mass allocation methodology). The Emissions allocated to residue co-product values shown in Table 7 were calculated according to the following methodology.

TABLE 8

| Parameter | Dry Mill Process | Wet Mill Process | Units |
|---|---|---|---|
| Assumptions | | | |
| Stover:kernel mass ratio | 1 | 1 | kg(stover)/kg(kernel) |
| Fraction of stover removed | 0.5 | 0.5 | |
| Carbon intensity of whole crop produced | 35.9 | 37.2 | gCO2/MJ(eth) |
| Algorithm output | | | |
| Carbon intensity reduction from WCBP | 12.0 | 12.4 | gCO2/MJ(eth) |

In this example, the reduction in regulatory value for dry mill corn ethanol is 12.0 gCO2/MJ and the regulatory value for wet mill corn ethanol is 12.4 gCO2/MJ.

In Example 9, the Assumptions are defined as follows: Stover:kernel mass ratio defines the ratio of corn stover yield to corn kernel yield on a dry mass basis; fraction of stover removed defines the fraction of corn stover removed from the field, with the remainder assumed to be left in place to advance erosion protection, soil fertility, and/or other agricultural objectives; Carbon intensity of whole crop produced defines the emissions embodied in the total agricultural products destined for products and co-products—in this example it equals the sum of emissions from "Crop cultivation" and "Chemical inputs to agriculture." E.g., 5.65±30.2=35.9. However, if an emissions accounting framework includes emissions factors for indirect effects of dedicating agricultural production to biofuels (e.g., indirect land use change), then this emissions factor might also be included in determining the "carbon intensity of whole crop produced."

The Algorithm output is equal to the product of the "Carbon intensity of whole crop produced" and the mass ratio of stover dedicated to co-products to all agricultural outputs destined for products or co-products—in this case the mass ratio is equal to 0.5 (the mass of agricultural residues removed per mass unit of kernels produced for ethanol) divided by 1.5 (the mass of all agricultural outputs destined for products or co-products per mass unit of kernels produced for ethanol). E.g., 35.9*(0.5/1.5)=12.0.

The foregoing examples present illustrative embodiments of the invention and numerous other embodiments are readily implementable, using the teachings and suggestions of this disclosure. For example, other embodiments can exist within the California Low carbon fuel standard, as well as in the context of similar and analogous fuel policies in other jurisdictions (e.g., UK RTFO and EU RED and FQD). Likewise, other embodiments can account for different combinations of system components. For example, loss factors could be applied to reflect residue carbon losses due to degradation during Residue Storage, transport, and the like.

While the technology has been particularly shown and described with reference to specific embodiments, it should be understood by those skilled in the art that various changes in form and detail may be made without departing from the spirit and scope of the technology as defined by the appended claims.

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Comustion with coal (coal biomass co-fire) in pulvarized coal or other type boiler | Heat, power, &/or electricity |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Combustion with other bimass in a biomass boiler | Heat, power, &/or electricity |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Combustion in a stand alone boiler | Heat, power, &/or electricity |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Torrefaction | torrefied biomass; heat, power, &/or electricity |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Carbonization | bio-coal, bio-liquids, and bio-gases; secondary products derived from primary solid, liquid, and gaseous products. |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Hydro-thermal upgrading | bio-solids, bio-oils &/or bio-gases; secondary products derived from primary bio-solids, liquids, &/or gases |
| Corn/maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/or distillers grains); cellulose-derived polymers and chemicals; secondary fuels or chemicals derived from primary | Stalks, stems, leaves, cobs, stover, etc. | Gasification | Synthesis gas and secondary products derived from synthesis gas (e.g., synthetic natural gas) |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Gasification & combustion (e.g., IGCC) | Heat, power, &/or electricity |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Gasification & synthesis of fuels or chemicals | liquid &/or gaseous fuels (e.g., FT diesel & naphtha; bio-alcohols, DME, etc.) &/or chemicals |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Liquefaction | solid, liquid, &/or gaseous fuels &/or chemicals; secondary products derived from primary solid, liquid, and gaseous products. |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Fermentation (by various technological routes & component technologies) | Bio-alcohols, bio-solids, &/or CO2; secondary products derived from primary products. |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Bio-digestion | Bio-gas; synthetic liquids &/or gaseous fuels or chemicals derived from bio-gas; heat, power, &/or electricity |
| Corn/ maize | fermentation | Bio-alcohols (ethanol, butanol, etc.); &/or secondary fuels derived from primary bio-alcohol products (e.g., ethanol-derived gasoline substitutes) | Any combination of: vegetable oils and/or oil-derived fuels and chemicals; human or animal food products (e.g., syrups, grain meal and/ or distillers grains); cellulose-derived polymers and chemicals; secondary fuels or chemicals derived from primary | Stalks, stems, leaves, cobs, stover, etc. | Solid Phase Biomass Carbon Storage | Sequestered biomass carbon and secondary products subsequently produced |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Comustion with coal (coal biomass co-fire) in pulvarized coal or other type boiler | Heat, power, &/or electricity |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Combustion with other bimass in a biomass boiler | Heat, power, &/or electricity |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Combustion in a stand alone boiler | Heat, power, &/or electricity |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Torrefaction | torrefied biomass; heat, power, &/or electricity |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Carbonization | bio-coal, bio-liquids, and bio-gases; secondary products derived from primary solid, liquid, and gaseous products. |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Hydro-thermal upgrading | bio-solids, bio-oils &/or bio-gases; secondary products derived from primary bio-solids, liquids, &/or gases |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Gasification | Synthesis gas and secondary products derived from synthesis gas (e.g., synthetic natural gas) |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Gasification & combustion (e.g., IGCC) | Heat, power, &/or electricity |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Gasification & synthesis of fuels or chemicals | liquid &/or gaseous fuels (e.g., FT diesel & naphtha; bio-alcohols, DME, etc.) &/or chemicals |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Liquefaction | solid, liquid, &/or gaseous fuels &/or chemicals; secondary products derived from primary solid, liquid, and gaseous products. |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Fermentation (by various technological routes & component technologies) | Bio-alcohols, bio-solids, &/or CO2; secondary products derived from primary products. |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Bio-digestion | Bio-gas; synthetic liquids &/or gaseous fuels or chemicals derived from bio-gas; heat, power, &/or electricity |
| Sugar cane | Fermentation | Bio-alcohols (ethanol, butanol, etc.); &/or secondary fuels derived from primary bio-alcohol products (e.g., ethanol-derived gasoline substitutes) | Any combination of: sugar; syrups; molasses; animal feed; solid fuels; heat, power, &/or electricity; cellulose-derived polymers and chemicals; secondary fuels or chemicals derived from primary bio-alcohols (e.g., ethanol-derived gasoline substitutes); C | Stalks, stems, leaves, cane trash, bagasse, etc. | Solid Phase Biomass Carbon Storage | Sequestered biomass carbon and secondary products subsequently produced |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Comustion with coal (coal biomass co-fire) in pulvarized coal or other type boiler | Heat, power, &/or electricity |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Combustion with other bimass in a biomass boiler | Heat, power, &/or electricity |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Combustion in a stand alone boiler | Heat, power, &/or electricity |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Torrefaction | torrefied biomass; heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Carbonization | bio-coal, bio-liquids, and bio-gases; secondary products derived from primary solid, liquid, and gaseous products. |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Hydro-thermal upgrading | bio-solids, bio-oils &/or bio-gases; secondary products derived from primary bio-solids, liquids, &/or gases |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Gasification | Synthesis gas and secondary products derived from synthesis gas (e.g., synthetic natural gas) |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Gasification & combustion (e.g., IGCC) | Heat, power, &/or electricity |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Gasification & synthesis of fuels or chemicals | liquid &/or gaseous fuels (e.g., FT diesel & naphtha; bio-alcohols, DME, etc.) &/or chemicals |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Liquefaction | solid, liquid, &/or gaseous fuels &/or chemicals; secondary products derived from primary solid, liquid, and gaseous products. |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Fermentation (by various technological routes & component technologies) | Bio-alcohols, bio-solids, &/or $CO_2$; secondary products derived from primary products. |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Bio-digestion | Bio-gas; synthetic liquids &/or gaseous fuels or chemicals derived from bio-gas; heat, power, &/or electricity |
| Wheat | Fermentation | Bio-alcohols (ethanol, butanol, etc.); &/or secondary fuels derived from primary bio-alcohol products (e.g., ethanol-derived gasoline substitutes) | Any combination of: human &/or animal food products (e.g., syrups, distillers grains & solubles, etc.); solid fuels; heat, power, &/or electricity; cellulose-derived polymers and chemicals; secondary fuels or chemicals derived from primary bio-alcohols (e | Stems, leaves, straw, husks, bran, etc. | Solid Phase Biomass Carbon Storage | Sequestered biomass carbon and secondary products subsequently produced |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Comustion with coal (coal biomass co-fire) in pulvarized coal or other type boiler | Heat, power, &/or electricity |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Combustion with other bimass in a biomass boiler | Heat, power, &/or electricity |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Combustion in a stand alone boiler | Heat, power, &/or electricity |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Torrefaction | torrefied biomass; heat, power, &/or electricity |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Carbonization | bio-coal, bio-liquids, and bio-gases; secondary products derived from primary solid, liquid, and gaseous products. |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Hydro-thermal upgrading | bio-solids, bio-oils &/or bio-gases; secondary products derived from primary bio-solids, liquids, &/or gases |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Gasification | Synthesis gas and secondary products derived from synthesis gas (e.g., synthetic natural gas) |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Gasification & combustion (e.g., IGCC) | Heat, power, &/or electricity |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Gasification & synthesis of fuels or chemicals | liquid &/or gaseous fuels (e.g., FT diesel & naphtha; bio-alcohols, DME, etc.) &/or chemicals |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Liquefaction | solid, liquid, &/or gaseous fuels &/or chemicals; secondary products derived from primary solid, liquid, and gaseous products. |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Fermentation (by various technological routes & component technologies) | Bio-alcohols, bio-solids, &/or CO2; secondary products derived from primary products. |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Bio-digestion | Bio-gas; synthetic liquids &/or gaseous fuels or chemicals derived from bio-gas; heat, power, &/or electricity |
| Sugar beet | Fermentation | Bio-alcohols (ethanol, butanol, etc.); &/or secondary fuels & derived from primary bio-alcohol products (e.g., ethanol-derived gasoline substitutes) | Any combination of: human or animal food products (e.g., pulp); fertilizers (e.g., vinasse); chalk; secondary fuels or chemicals from primary bio-alcohol products (e.g., ethanol-derived gasoline substitutes); etc. | Leaves, crowns, etc. | Solid Phase Biomass Carbon Storage | Sequestered biomass carbon and secondary products subsequently produced |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Comustion with coal (coal biomass co-fire) in pulvarized coal or other type boiler | Heat, power, &/or electricity |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Combustion with other bimass in a biomass boiler | Heat, power, &/or electricity |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Combustion in a stand alone boiler | Heat, power, &/or electricity |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Torrefaction | torrefied biomass; heat, power, &/or electricity |

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Carbonization | bio-coal, bio-liquids, and bio-gases; secondary products derived from primary solid, liquid, and gaseous products. |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Hydro-thermal upgrading | bio-solids, bio-oils &/or bio-gases; secondary products derived from primary bio-solids, liquids, &/or gases |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Gasification | Synthesis gas and secondary products derived from synthesis gas (e.g., synthetic natural gas) |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Gasification & combustion (e.g., IGCC) | Heat, power, &/or electricity |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Gasification & synthesis of fuels or chemicals | liquid &/or gaseous fuels (e.g., FT diesel & naphtha; bio-alcohols, DME, etc.) &/or chemicals |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Liquefaction | solid, liquid, &/or gaseous fuels &/or chemicals; secondary products derived from primary solid, liquid, and gaseous products. |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Fermentation (by various technological routes & component technologies) | Bio-alcohols, bio-solids, &/or CO2; secondary products derived from primary products. |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Bio-digestion | Bio-gas; synthetic liquids &/or gaseous fuels or chemicals derived from bio-gas; heat, power, &/or electricity |
| Soybean | trans-esterification | Fatty acid methyl esters (bio-diesel); fuels &/or chemicals derived from bio-diesel | Any combination of: human or animal food products (e.g., oil cake, soy meal, etc.); glycerine; secondary fuels or chemicals derived from bio-diesel or vegetable oil; etc. | Stems, leaves, pods, hulls, etc. | Solid Phase Biomass Carbon Storage | Sequestered biomass carbon and secondary products subsequendly produced |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Comustion with coal (coal biomass co-fire) in pulvarized coal or other type boiler | Heat, power, &/or electricity |

-continued

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Combustion with other bimass in a biomass boiler | Heat, power, &/or electricity |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Combustion in a stand alone boiler | Heat, power, &/or electricity |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Torrefaction | torrefied biomass; heat, power, &/or electricity |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Carbonization | bio-coal, bio-liquids, and bio-gases; secondary products derived from primary solid, liquid, and gaseous products. |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Hydro-thermal upgrading | bio-solids, bio-oils &/or bio-gases; secondary products derived from primary bio-solids, liquids, &/or gases |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Gasification | Synthesis gas and secondary products derived from synthesis gas (e.g., synthetic natural gas) |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Gasification & combustion (e.g., IGCC) | Heat, power, &/or electricity |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Gasification & synthesis of fuels or chemicals | liquid &/or gaseous fuels (e.g., FT diesel & naphtha; bio-alcohols, DME, etc.) &/or chemicals |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Liquefaction | solid, liquid, &/or gaseous fuels &/or chemicals; secondary products derived from primary solid, liquid, and gaseous products. |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Fermentation (by various technological routes & component technologies) | Bio-alcohols, bio-solids, &/or CO2; secondary products derived from primary products. |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Bio-digestion | Bio-gas; synthetic liquids &/or gaseous fuels or chemicals derived from bio-gas; heat, power, &/or electricity |
| Soybean | Hydro-treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, soy meal, etc.); hydrocarbons; secondary fuels or chemicals derived from vegetable oil or primary hydrocarbon products; etc. | Stalks, stems, leaves, pods, hulls, etc. | Solid Phase Biomass Carbon Storage | Sequestered biomass carbon and secondary products subsequently produced |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Comustion with coal (coal biomass co-fire) in pulvarized coal or other type boiler | Heat, power, &/or electricity |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Combustion with other bimass in a biomass boiler | Heat, power, &/or electricity |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Combustion in a stand alone boiler | Heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Torrefaction | torrefied biomass; heat, power, &/or electricity |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Carbonization | bio-coal, bio-liquids, and bio-gases; secondary products derived from primary solid, liquid, and gaseous products. |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Hydro-thermal upgrading | bio-solids, bio-oils &/or bio-gases; secondary products derived from primary bio-solids, liquids, &/or gases |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Gasification | Synthesis gas and secondary products derived from synthesis gas (e.g., synthetic natural gas) |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Gasification & combustion (e.g., IGCC) | Heat, power, &/or electricity |

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Gasification & synthesis of fuels or chemicals | liquid &/or gaseous fuels (e.g., FT diesel & naphtha; bio-alcohols, DME, etc.) &/or chemicals |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Liquefaction | solid, liquid, &/or gaseous fuels &/or chemicals; secondary products derived from primary solid, liquid, and gaseous products. |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Fermentation (by various technological routes & component technologies) | Bio-alcohols, bio-solids, &/or CO2; secondary products derived from primary products. |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Bio-digestion | Bio-gas; synthetic liquids &/or gaseous fuels or chemicals derived from bio-gas; heat, power, &/or electricity |
| Oil-seed (e.g., canola, rapeseed, camolina, mustard, flax, sunflower, hemp, field penycress, etc.) | trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Stalks, stems, leaves, shells, etc. | Solid Phase Biomass Carbon Storage | Sequestered biomass carbon and secondary products subsequently produced |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Comustion with coal (coal biomass co-fire) in pulvarized coal or other type boiler | Heat, power, &/or electricity |

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Combustion with other bimass in a biomass boiler | Heat, power, &/or electricity |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Combustion in a stand alone boiler | Heat, power, &/or electricity |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Torrefaction | torrefied biomass; heat, power, &/or electricity |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Carbonization | bio-coal, bio-liquids, and bio-gases; secondary products derived from primary solid, liquid, and gaseous products. |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Hydro-thermal upgrading | bio-solids, bio-oils &/or bio-gases; secondary products derived from primary bio-solids, liquids, &/or gases |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Gasification | Synthesis gas and secondary products derived from synthesis gas (e.g., synthetic natural gas) |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Gasification & combustion (e.g., IGCC) | Heat, power, &/or electricity |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Gasification & synthesis of fuels or chemicals | liquid &/or gaseous fuels (e.g., FT diesel & naphtha; bio-alcohols, DME, etc.) &/or chemicals |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Liquefaction | solid, liquid, &/or gaseous fuels &/or chemicals; secondary products derived from primary solid, liquid, and gaseous products. |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Fermentation (by various technological routes & component technologies) | Bio-alcohols, bio-solids, &/or CO2; secondary products derived from primary products. |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Bio-digestion | Bio-gas; synthetic liquids &/or gaseous fuels or chemicals derived from bio-gas; heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil-seed (e.g., canola, rapeseed, camolina, mustard, flax, sunflower, hemp, field penycress, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Stalks, stems, leaves, shells, pods, etc. | Solid Phase Biomass Carbon Storage | Sequestered biomass carbon and secondary products subsequently produced |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Comustion with coal (coal biomass co-fire) in pulvarized coal or other type boiler | Heat, power, &/or electricity |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Combustion with other bimass in a biomass boiler | Heat, power, &/or electricity |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Combustion in a stand alone boiler | Heat, power, &/or electricity |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Torrefaction | torrefied biomass; heat, power, &/or electricity |

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Carbonization | bio-coal, bio-liquids, and bio-gases; secondary products derived from primary solid, liquid, and gaseous products. |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Hydro-thermal upgrading | bio-solids, bio-oils &/or bio-gases; secondary products derived from primary bio-solids, liquids, &/or gases |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Gasification | Synthesis gas and secondary products derived from synthesis gas (e.g., synthetic natural gas) |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Gasification & combustion (e.g., IGCC) | Heat, power, &/or electricity |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Gasification & synthesis of fuels or chemicals | liquid &/or gaseous fuels (e.g., FT diesel & naphtha; bio-alcohols, DME, etc.) &/or chemicals |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Liquefaction | solid, liquid, &/or gaseous fuels &/or chemicals; secondary products derived from primary solid, liquid, and gaseous products. |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Fermentation (by various technological routes & component technologies) | Bio-alcohols, bio-solids, &/or CO2; secondary products derived from primary products. |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Bio-digestion | Bio-gas; synthetic liquids &/or gaseous fuels or chemicals derived from bio-gas; heat, power, &/or electricity |
| Oil seeds from trees or woody shrubs (e.g., palm, *jatropha*, Mahua, *pongamia pinnata*, etc.) | Trans-esterification | Fatty acid methyl esters (bio-diesel); fuels &/or chemicals derived from bio-diesel | Any combination of: human or animal food products (e.g., oil cake, meal, etc.); glycerine; secondary fuels or chemicals derived from bio-diesel or vegetable oil; etc. | Leaves, stems, branches, trimmings, shells, pods, etc. | Solid Phase Biomass Carbon Storage | Sequestered biomass carbon and secondary products subsequendly produced |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Comustion with coal (coal biomass co-fire) in pulvarized coal or other type boiler | Heat, power, &/or electricity |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Combustion with other bimass in a biomass boiler | Heat, power, &/or electricity |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Combustion in a stand alone boiler | Heat, power, &/or electricity |

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Torrefaction | torrefied biomass; heat, power, &/or electricity |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Carbonization | bio-coal, bio-liquids, and bio-gases; secondary products derived from primary solid, liquid, and gaseous products. |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Hydro-thermal upgrading | bio-solids, bio-oils &/or bio-gases; secondary products derived from primary bio-solids, liquids, &/or gases. |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Gasification | Synthesis gas and secondary products derived from synthesis gas (e.g., synthetic natural gas) |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Gasification & combustion (e.g., IGCC) | Heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Gasification & synthesis of fuels or chemicals | liquid &/or gaseous fuels (e.g., FT diesel & naphtha; bio-alcohols, DME, etc.) &/or chemicals |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Liquefaction | solid, liquid, &/or gaseous fuels &/or chemicals; secondary products derived from primary solid, liquid, and gaseous products. |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Fermentation (by various technological routes & component technologies) | Bio-alcohols, bio-solids, &/or CO2; secondary products derived from primary products. |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Bio-digestion | Bio-gas; synthetic liquids, &/or gaseous fuels or chemicals derived from bio-gas; heat, power, &/or electricity |
| Oil seeds from trees or woody shrubs (e.g., palm, *jatropha*, Mahua, *pongamia pinnata*, etc.) | Hydro-thermal treatment (e.g., hydrogenation) | Liquid &/or gaseous fuels derived hydro-thermal treatment of vegetable oils (e.g., renewable diesel, bio-jet fuel, bio-kerosene, etc.) | Any combination of: human or animal food products (e.g., oil cake, meal, etc.); hydrocarbons; secondary fuels or chemicals derived from vegetable oil or primary hydrocarbon products; etc. | Leaves, stems, branches, trimmings, shells, pods, etc. | Solid Phase Biomass Carbon Storage | Sequestered biomass carbon and secondary products subsequently produced |
| Cellulosic biomass | n via various pathways (e.g., pretreatment via alkaline processing, acid hydrolysis, steam explosion, | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or | Comustion with coal (coal biomass co-fire) in pulvarized coal or other type boiler | Heat, power, &/or electricity |

| Exhibit A: Defining components of sample Whole Crop Biofuel Production systems ||||||| 
| Components in existing or proposed biofuel production systems |||| Components associated with agricultural |||
| Primary biofuel feedstock | Primary conversion process | Primary biofuel(s) | Processing co-products | Agricultural residues | Residue utilization technology | Residue-drived co-products |
| --- | --- | --- | --- | --- | --- | --- |
| | etc.); hydrolysis via acid or enzymatic treatments; many alternate fermentation-based pathways; etc.) | | | is otherwise diverted from biofuel production | | |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Combustion with other bimass in a biomass boiler | Heat, power, &/or electricity |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Combustion in a stand alone boiler | Heat, power, &/or electricity |
| Cellulosic biomass | n via various pathways (e.g., pretreatment via alkaline processing, acid hydrolysis, steam explosion, etc.; hydrolysis via acid or | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| | enzymatic treatments; many alternate fermentation-based pathways; etc.) | | | production | | |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Torrefaction | torrefied biomass; heat, power, &/or electricity |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Carbonization | bio-coal, bio-liquids, and bio-gases; secondary products derived from primary solid, liquid, and gaseous products. |
| Cellulosic biomass | n via various pathways (e.g., pretreatment via alkaline processing, acid hydrolysis, steam explosion, etc.; hydrolysis via acid or enzymatic treatments; many | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Hydro-thermal upgrading | bio-solids, bio-oils &/or bio-gases; secondary products derived from primary bio-solids, liquids, &/or gases |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| | alternate fermentation-based pathways; etc.) | | | | | |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Gasification | Synthesis gas and secondary products derived from synthesis gas (e.g., synthetic natural gas) |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Gasification & combustion (e.g., IGCC) | Heat, power, &/or electricity |
| Cellulosic biomass | n via various pathways (e.g., pretreatment via alkaline processing, acid hydrolysis, steam explosion, etc.; hydrolysis via acid or enzymatic treatments; many | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Gasification & synthesis of fuels or chemicals | liquid &/or gaseous fuels (e.g., FT diesel & naphtha; bio-alcohols, DME, etc.) &/or chemicals |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| | alternate fermentation-based pathways; etc.) | | | | | |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Liquefaction | solid, liquid, &/or gaseous fuels &/or chemicals; secondary products derived from primary solid, liquid, and gaseous products. |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Fermentation (by various technological routes & component technologies) | Bio-alcohols, bio-solids, &/or CO2; secondary products derived from primary products. |
| Cellulosic biomass | n via various pathways (e.g., pretreatment via alkaline processing, acid hydrolysis, steam explosion, etc.; hydrolysis via acid or enzymatic treatments; | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Bio-digestion | Bio-gas; synthetic liquids &/or gaseous fuels or chemicals derived from bio-gas; heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | n via various pathways (e.g., pretreatment via alkaline processing, acid hydrolysis, steam explosion, etc.; hydrolysis via acid or enzymatic treatments; many alternate fermentation-based pathways; etc.) | Bio-alcohols (ethanol, butanol, etc.); &/or secondary fuels derived from primary bio-alcohol products (e.g., ethanol-derived gasoline substitutes) | Any combination of: heat, power, & electricity; &/or secondary fuels or chemicals derived from primary bio-alcohol products (e.g., ethanol derived hydrocarbons) | leaves, stems, branches, and other biomass that is deemed unsuitable for processing, transport, or conversion to biofuel, or is otherwise diverted from biofuel production | Solid Phase Biomass Carbon Storage | Sequestered biomass carbon and secondary products subsequendly produced |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Comustion with coal (coal biomass co-fire) in pulvarized coal or other type boiler | Heat, power, &/or electricity |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Combustion with other bimass in a biomass boiler | Heat, power, &/or electricity |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion | Combustion in a stand alone boiler | Heat, power, &/or electricity |

-continued

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| | | | | to biofuel, or is otherwise diverted from biofuel production | | |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Torrefaction | torrefied biomass; heat, power, &/or electricity |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Carbonization | bio-coal, bio-liquids, and bio-gases; secondary products derived from primary solid, liquid, and gaseous products. |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Hydro-thermal upgrading | bio-solids, bio-oils &/or bio-gases; secondary products derived from primary bio-solids, liquids, &/or gases |

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Gasification | Synthesis gas and secondary products derived from synthesis gas (e.g., synthetic natural gas) |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Gasification & combustion (e.g., IGCC) | Heat, power, &/or electricity |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Gasification & synthesis of fuels or chemicals | liquid &/or gaseous fuels (e.g., FT diesel & naphtha; bio-alcohols, DME, etc.) &/or chemicals |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Liquefaction | solid, liquid, &/or gaseous fuels &/or chemicals; secondary products derived from primary solid, liquid, and gaseous products. |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Fermentation (by various technological routes & component technologies) | Bio-alcohols, bio-solids, &/or CO2; secondary products derived from primary products. |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Bio-digestion | Bio-gas; synthetic liquids &/or gaseous fuels or chemicals derived from bio-gas; heat, power, &/or electricity |
| Cellulosic biomass | Gasification & liquid fuel synthesis (e.g., alcohol synthesis, FT synthesis, etc.) | Synthetic liquid and/or gaseous fuels (e.g., bio-alcohols, FT liquids, etc.); secondary products derived from primary liquid and gaseous products | Liquid chemicals (e.g., naphtha) &/or gaseous fuels or chemicals; secondary products derived from primary liquid &/or gaseous fuels &/or chemicals | leaves, stems, branches, and other biomass that is deemed unsuitable for processing, transport, or conversion to biofuel, or is otherwise diverted from biofuel production | Solid Phase Biomass Carbon Storage | Sequestered biomass carbon and secondary products subsequently produced |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Comustion with coal (coal biomass co-fire) in pulvarized coal or other type boiler | Heat, power, &/or electricity |

-continued

Exhibit A: Defining components of sample Whole Crop Biofuel Production systems

| | Components in existing or proposed biofuel production systems | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Combustion with other bimass in a biomass boiler | Heat, power, &/or electricity |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Combustion in a stand alone boiler | Heat, power, &/or electricity |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Torrefaction | torrefied biomass; heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Carbonization | bio-coal, bio-liquids, and bio-gases; secondary products derived from primary solid, liquid, and gaseous products. |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Hydro-thermal upgrading | bio-solids, bio-oils &/or bio-gases; secondary products derived from primary bio-solids, liquids, &/or gases |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification | Synthesis gas and secondary products derived from synthesis gas (e.g., synthetic natural gas) |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & combustion (e.g., IGCC) | Heat, power, &/or electricity |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & synthesis of fuels or chemicals | liquid &/or gaseous fuels (e.g., FT diesel & naphtha; bio-alcohols, DME, etc.) &/or chemicals |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Liquefaction | solid, liquid, &/or gaseous fuels &/or chemicals; secondary products derived from primary solid, liquid, and gaseous products. |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Fermentation (by various technological routes & component technologies) | Bio-alcohols, bio-solids, &/or CO2; secondary products derived from primary products. |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Bio-digestion | Bio-gas; synthetic liquids &/or gaseous fuels or chemicals derived from bio-gas; heat, power, &/or electricity |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Liquefaction | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Solid Phase Biomass Carbon Storage | Sequestered biomass carbon and secondary products subsequently produced |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Comustion with coal (coal biomass co-fire) in pulvarized coal or other type boiler | Heat, power, &/or electricity |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Combustion with other bimass in a biomass boiler | Heat, power, &/or electricity |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Combustion in a stand alone boiler | Heat, power, &/or electricity |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Torrefaction | torrefied biomass; heat, power, &/or electricity |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Carbonization | bio-coal, bio-liquids, and bio-gases; secondary products derived from primary solid, liquid, and gaseous products. |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Hydro-thermal upgrading | bio-solids, bio-oils &/or bio-gases; secondary products derived from primary bio-solids, liquids, &/or gases |

-continued

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification | Synthesis gas and secondary products derived from synthesis gas (e.g., synthetic natural gas) |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & combustion (e.g., IGCC) | Heat, power, &/or electricity |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & synthesis of fuels or chemicals | liquid &/or gaseous fuels (e.g., FT diesel & naphtha; bio-alcohols, DME, etc.) &/or chemicals |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Liquefaction | solid, liquid, &/or gaseous fuels &/or chemicals; secondary products derived from primary solid, liquid, and gaseous products. |

-continued

Exhibit A: Defining components of sample Whole Crop Biofuel Production systems

| | Components in existing or proposed biofuel production systems | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Fermentation (by various technological routes & component technologies) | Bio-alcohols, bio-solids, &/or CO2; secondary products derived from primary products. |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Bio-digestion | Bio-gas; synthetic liquids &/or gaseous fuels or chemicals derived from bio-gas; heat, power, &/or electricity |
| Cellulosic biomass | Hydro-thermal Upgrading | Bio-oils, &/or bio-gases (e.g., for CNG vehicles); secondary fuels derived from primary solid, liquid, and gaseous products | Bio-solids (e.g., bio-coal), liquid chemicals, &/or gaseous fuels &/or chemicals; heat, power, &/or electricity | leaves, stems, branches, and other biomass that is deemed unsuitable for processing, transport, or conversion to biofuel, or is otherwise diverted from biofuel production | Solid Phase Biomass Carbon Storage | Sequestered biomass carbon and secondary products subsequently produced |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Comustion with coal (coal biomass co-fire) in pulvarized coal or other type boiler | Heat, power, &/or electricity |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for | Combustion with other bimass in a biomass boiler | Heat, power, &/or electricity |

-continued

Exhibit A: Defining components of sample Whole Crop Biofuel Production systems

| Components in existing or proposed biofuel production systems | | | | Components associated with agricultural | | |
| --- | --- | --- | --- | --- | --- | --- |
| Primary biofuel feedstock | Primary conversion process | Primary biofuel(s) | Processing co-products | Agricultural residues | Residue utilization technology | Residue-drived co-products |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | processing, transport, or conversion to biofuel, or is otherwise diverted from biofuel production leaves, stems, branches, and other biomass that is deemed unsuitable for processing, transport, or conversion to biofuel, or is otherwise diverted from biofuel production | Combustion in a stand alone boiler | Heat, power, &/or electricity |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Pyrolysis | bio-solids (e.g., bio-char), bio-liquids (e.g., bio-oil), &/or bio-gases (non-condensing hydrocarbons); fuels or chemicals derived from solid, liquid, or gaseous primary products. |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Torrefaction | torrefied biomass; heat, power, &/or electricity |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Carbonization | bio-coal, bio-liquids, and bio-gases; secondary products derived from primary solid, liquid, and gaseous products. |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Hydro-thermal upgrading | bio-solids, bio-oils &/or bio-gases; secondary products derived from primary bio-solids, liquids, &/or gases |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification | Synthesis gas and secondary products derived from synthesis gas (e.g., synthetic natural gas) |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & combustion (e.g., IGCC) | Heat, power, &/or electricity |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Gasification & synthesis of fuels or chemicals | liquid &/or gaseous fuels (e.g., FT diesel & naphtha; bio-alcohols, DME, etc.) &/or chemicals |

-continued

Exhibit A: Defining components of sample Whole Crop Biofuel Production systems

| Components in existing or proposed biofuel production systems | | | | Components associated with agricultural | | |
|---|---|---|---|---|---|---|
| Primary biofuel feedstock | Primary conversion process | Primary biofuel(s) | Processing co-products | Agricultural residues | Residue utilization technology | Residue-drived co-products |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Liquefaction | solid, liquid, &/or gaseous fuels &/or chemicals; secondary products derived from primary solid, liquid, and gaseous products. |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Fermentation (by various technological routes & component technologies) | Bio-alcohols, bio-solids, &/or CO2; secondary products derived from primary products. |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Bio-digestion | Bio-gas; synthetic liquids &/or gaseous fuels or chemicals derived from bio-gas; heat, power, &/or electricity |
| Cellulosic biomass | Pyrolysis | Bio-oils, &/or bio-gases (e.g., for CNG vehicles); secondary fuels derived from primary solid, liquid, and gaseous products | Bio-solids (e.g., bio-char), liquid or gaseous fuels &/or chemicals (e.g., hydrogen, methane, etc.); solid, liquid &/or gaseous fuels &/or chemicals; heat, power, &/or electricity | leaves, stems, branches, and other biomass that is deemed unsuitable for processing, transport, or conversion to biofuel, or is otherwise diverted from biofuel production | Solid Phase Biomass Carbon Storage | Sequestered biomass carbon and secondary products subsequendly produced |

The invention claimed is:

1. A computerized method of using a data processor having a memory to account for carbon flows and determine a regulatory value for a biofuel, the method comprising:
storing, by the data processor, in memory, one or more first carbon flow values characterizing the production and use of the biofuel derived from biofuel feedstock of an agricultural biomass;
storing, by the data processor, in memory, one or more second carbon flow values characterizing the production and use of a co-product from feedstock residue of the agricultural biomass, wherein the co-product mitigates anthropogenic greenhouse gas emission;
calculating, using the data processor, the regulatory value for the biofuel from the first carbon flow values and the second carbon flow values; and
using the regulatory value to qualify the biofuel as compliant with a regulatory framework.

2. The method of claim 1, wherein the co-product comprises one or more of electricity, heat, and power.

3. The method of claim 1, wherein the co-product comprises one or more of a cellulosic biofuel, solid biofuel, bio-char, bio-chemical, bio-plastic, building material, construction material, paper pulp, animal feed, and soil amendment.

4. The method of claim 1, wherein the co-product prevents carbon from the feedstock residue from flowing to the atmosphere.

5. The method of claim 1, wherein the co-product is a substitute for a fossil hydrocarbon product, thereby preventing carbon from a fossil hydrocarbon product from flowing to the atmosphere.

6. The method of claim 1 further comprising:
generating a tradable credit from the regulatory value for the biofuel; and
trading the biofuel having the tradable credit on an emission trading market.

7. The method of claim 1, wherein the production and use of the co-product comprises:
combining the co-product and coal in a generator,
producing, by the generator, electricity from the feedstock residue and the coal; and
determining, by the data processor, the one or more second carbon flow values for the co-product.

8. A method of engineering a carbon cycle for biofuel production and use, comprising:
arranging production of the biofuel by a first generator, the biofuel produced from biofuel feedstock of an agricultural biomass;
arranging production of a co-product by a second generator, the co-product produced from feedstock residue of the agricultural biomass, thereby mitigating anthropogenic greenhouse gas emission; and
assigning to the biofuel a regulatory value based upon a first set of one or more carbon intensity values characterizing production and use of the biofuel and a second set of one or more carbon intensity value characterizing production and use of the co-product.

9. The method of claim 8, wherein the co-product comprises one or more of electricity, heat, and power.

10. The method of claim 8, wherein the co-product comprises one or more of a cellulosic biofuel, solid biofuel, bio-char, bio-chemical, bio-plastic, building material, construction material, paper pulp, animal feed, and soil amendment.

11. The method of claim 8, wherein the co-product prevents carbon from the feedstock residue from flowing to the atmosphere.

12. The method of claim 8 further comprising using the regulatory value to qualify the biofuel as compliant with a regulatory framework.

13. The method of claim 8 further comprising:
generating a tradable credit from the regulatory value for the biofuel; and
trading the biofuel having the tradable credit on an emission trading market.

14. The method of claim 8, wherein the production and use of the co-product comprises:
combining the co-product and coal in a generator;
producing, by the generator, electricity from the feedstock residue and the coal; and
determining, by the computing device, the carbon intensity value for the co-product.

15. A method of manufacturing a biofuel, comprising:
producing, by a first generator, the biofuel from biofuel feedstock of an agricultural biomass;
producing, by a second generator, a co-product from feedstock residue of the agricultural biomass, wherein the co-product mitigates anthropogenic greenhouse gas emission; and
assigning to the biofuel a regulatory value based upon a first set of one or more carbon intensity values characterizing production and use of the biofuel and a second set of one or more carbon intensity value characterizing production and use of the co-product.

16. The method of claim 15, wherein the co-product comprises one or more of electricity, heat, and power.

17. The method of claim 15, wherein the co-product comprises one or more of a cellulosic biofuel, solid biofuel, bio-char, bio-chemical, bio-plastic, building material, construction material, paper pulp, animal feed, and soil amendment.

18. The method of claim 15, wherein the co-product prevents carbon from the feedstock residue from flowing to the atmosphere.

19. The method of claim 15 further comprising using the regulatory value to qualify the biofuel as compliant with a regulatory framework.

20. The method of claim 15 further comprising:
generating a tradable credit from the regulatory value for the biofuel; and
trading the biofuel having the tradable credit on an emission trading market.

* * * * *